United States Patent
Gottwerth et al.

(10) Patent No.: US 10,638,363 B2
(45) Date of Patent: Apr. 28, 2020

(54) LEGACY NETWORK MAXIMUM TRANSMISSION UNIT ISOLATION CAPABILITY THROUGH DEPLOYMENT OF A FLEXIBLE MAXIMUM TRANSMISSION UNIT PACKET CORE DESIGN

(71) Applicant: AT&T Intellectual Property I, L.P., Atlanta, GA (US)

(72) Inventors: Marc Gottwerth, Middletown, NJ (US); Terry Figurelle, Redmond, WA (US); Douglas Eng, Sammamish, WA (US); Layli Amiri, Leesburg, VA (US); Mario Manuel Jardon, Pembroke Pines, FL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 79 days.

(21) Appl. No.: 15/945,094

(22) Filed: Apr. 4, 2018

(65) Prior Publication Data
US 2019/0313280 A1   Oct. 10, 2019

(51) Int. Cl.
*H04W 28/06* (2009.01)
*H04W 80/04* (2009.01)
*H04W 84/04* (2009.01)

(52) U.S. Cl.
CPC ............ *H04W 28/06* (2013.01); *H04W 80/04* (2013.01); *H04W 84/045* (2013.01)

(58) Field of Classification Search
None
See application file for complete search history.

(56) References Cited

U.S. PATENT DOCUMENTS

| 5,892,753 | A | 4/1999 | Badt et al. |
| 6,934,768 | B1 * | 8/2005 | Block ................. H04L 69/16 |
| | | | 709/228 |

(Continued)

FOREIGN PATENT DOCUMENTS

| CN | 101552728 B | 5/2012 |
| WO | 2004/075487 A1 | 9/2004 |

(Continued)

OTHER PUBLICATIONS

Lettieri et al., "Adaptive Frame Length Control for Improving Wireless Link Throughput, Range, and Energy Efficiency," 1998, IEEE, 8 pages.

(Continued)

*Primary Examiner* — Ayaz R Sheikh
*Assistant Examiner* — Tarell A Hampton
(74) *Attorney, Agent, or Firm* — Amin, Turocy & Watson, LLP

(57) ABSTRACT

Facilitating flexible maximum transmission unit packet core design in a communications network is provided herein. A system can comprise a processor and a memory that stores executable instructions that, when executed by the processor, facilitate performance of operations. The operations can comprise receiving a first transmission unit setting from a first network device. The first transmission unit setting can indicate a size of a largest network layer protocol data unit that is able to be communicated in a single network transaction by the first network device. The operations can also comprise setting, at the device, a configuration of the first network device to the first transmission unit setting. Further, the operations can comprise sending first communication packets to the first network device using the first transmission unit setting and second communication packets to a (Continued)

second network device using a second transmission unit setting different from the first transmission unit setting.

20 Claims, 14 Drawing Sheets

(56) References Cited

U.S. PATENT DOCUMENTS

| | | | |
|---|---|---|---|
| 7,317,692 B2 | 1/2008 | Jason, Jr. et al. | |
| 7,609,721 B2 | 10/2009 | Rao et al. | |
| 7,697,524 B2 | 4/2010 | Subramanian et al. | |
| 7,969,876 B2 | 6/2011 | Samuels et al. | |
| 7,995,478 B2 | 8/2011 | Takeda et al. | |
| 8,005,968 B2 | 8/2011 | Mason et al. | |
| 8,364,796 B2 | 1/2013 | Hua et al. | |
| 8,422,501 B2 | 4/2013 | Das et al. | |
| 8,537,710 B2 | 9/2013 | Ner et al. | |
| 8,675,647 B1* | 3/2014 | Luciani | H04L 29/06 370/389 |
| 9,219,579 B2 | 12/2015 | Rao et al. | |
| 9,237,110 B2* | 1/2016 | DeCusatis | H04L 47/365 |
| 9,271,164 B2 | 2/2016 | Cheng | |
| 9,407,504 B1* | 8/2016 | Di Benedetto | H04L 12/4633 |
| 9,445,384 B2* | 9/2016 | Choo | H04L 47/36 |
| 9,603,057 B2* | 3/2017 | Kuningas | |
| 9,743,338 B2 | 8/2017 | Sung et al. | |
| 9,912,600 B1 | 3/2018 | Attarwala et al. | |
| 2001/0021190 A1* | 9/2001 | Hummel | H04L 45/00 370/392 |
| 2002/0141448 A1* | 10/2002 | Matsunaga | H04L 29/06 370/469 |
| 2003/0056009 A1* | 3/2003 | Mizrachi | H04L 47/34 709/245 |
| 2003/0079041 A1* | 4/2003 | Parrella, Sr. | H03M 7/30 709/247 |
| 2003/0091038 A1* | 5/2003 | Hagedom | H04L 49/1507 370/359 |
| 2004/0158622 A1* | 8/2004 | Pitts | H04L 29/06 709/220 |
| 2004/0218550 A1* | 11/2004 | Kim | H04L 47/36 370/254 |
| 2005/0018703 A1* | 1/2005 | Blasco Claret | H04J 3/1694 370/432 |
| 2005/0041635 A1* | 2/2005 | Chung | H04L 47/10 370/351 |
| 2005/0099943 A1* | 5/2005 | Naghian | H04W 72/00 370/229 |
| 2005/0195835 A1* | 9/2005 | Savage | H04L 43/00 370/401 |
| 2006/0221844 A1* | 10/2006 | Subramanian | H04L 12/18 370/248 |
| 2008/0107026 A1* | 5/2008 | Backman | H04L 47/10 370/235 |
| 2008/0159150 A1 | 7/2008 | Ansari | |
| 2009/0185572 A1* | 7/2009 | Yasuma | H04L 12/4625 370/401 |
| 2009/0303947 A1* | 12/2009 | Karino | H04L 47/26 370/329 |
| 2011/0243063 A1* | 10/2011 | Kuningas | H04W 28/16 370/328 |
| 2011/0274120 A1* | 11/2011 | Dang | H04L 49/9094 370/474 |
| 2012/0155460 A1* | 6/2012 | Gu | H04W 28/06 370/389 |
| 2014/0376427 A1* | 12/2014 | Hui | H04L 5/16 370/296 |
| 2015/0117207 A1* | 4/2015 | Radulescu | H04L 43/10 370/235 |
| 2015/0146531 A1* | 5/2015 | Welin | H04L 47/36 370/235 |
| 2015/0382240 A1* | 12/2015 | Hecht | H04L 69/22 370/316 |
| 2016/0218962 A1* | 7/2016 | Huang-Fu | H04L 29/08 |
| 2016/0248749 A1* | 8/2016 | Mahapatra | H04L 45/74 |
| 2016/0353229 A1* | 12/2016 | Kawabe | H04L 27/0008 |
| 2016/0380902 A1* | 12/2016 | Sreeramoju | H04L 47/36 370/401 |
| 2017/0055274 A1* | 2/2017 | Tanji | H04W 76/14 |
| 2017/0302584 A1 | 10/2017 | Raj et al. | |
| 2017/0353935 A1* | 12/2017 | Xiang | H04W 56/0015 |
| 2018/0077075 A1* | 3/2018 | Sreenivasan | H04L 45/42 |
| 2019/0052572 A1* | 2/2019 | Naik | H04W 76/12 |

FOREIGN PATENT DOCUMENTS

| | | |
|---|---|---|
| WO | 2009/026824 A1 | 3/2009 |
| WO | 2016/192402 A1 | 12/2016 |

OTHER PUBLICATIONS

Kant, "Data center evolution: A tutorial on state of the art, issues, and challenges," Computer Networks, 2009, vol. 53, pp. 2939-2965, Elsevier, 27 pages.

* cited by examiner

| TUNNEL ENDPOINT IDENTIFIER (TEID) | MTU SIZE |
|---|---|
| 98776 | 1500 |
| 24589 | 1500 |
| 19763 | 1600 |
| 29834 | 2000 |
| 97382 | 9600 |

FIG. 8

LEGACY NETWORK MAXIMUM TRANSMISSION UNIT ISOLATION CAPABILITY THROUGH DEPLOYMENT OF A FLEXIBLE MAXIMUM TRANSMISSION UNIT PACKET CORE DESIGN

TECHNICAL FIELD

The subject disclosure relates generally to communications systems, and, for example, to maximum transmission unit packet core design in communication networks.

BACKGROUND

In communication networks, the maximum transmission unit setting, particularly in the mobile packet core, has remained at a constant value and, thus, has been implemented as a "one size fits all" approach. For example, the "one size fits all" approach for the maximum transmission unit setting is applied to legacy communication networks and updated communication networks that can support a higher maximum transmission unit setting. Therefore, unique opportunities exist for application of the maximum transmission unit setting in an end-to-end network, which can comprise both legacy communication networks and updated communication networks.

BRIEF DESCRIPTION OF THE DRAWINGS

Various non-limiting embodiments are further described with reference to the accompanying drawings in which:

FIG. 8 illustrates an example, non-limiting, maximum transmission unit data structure that tracks maximum transmission unit network capability in accordance with one or more embodiments described herein;

DETAILED DESCRIPTION

Figure 1:
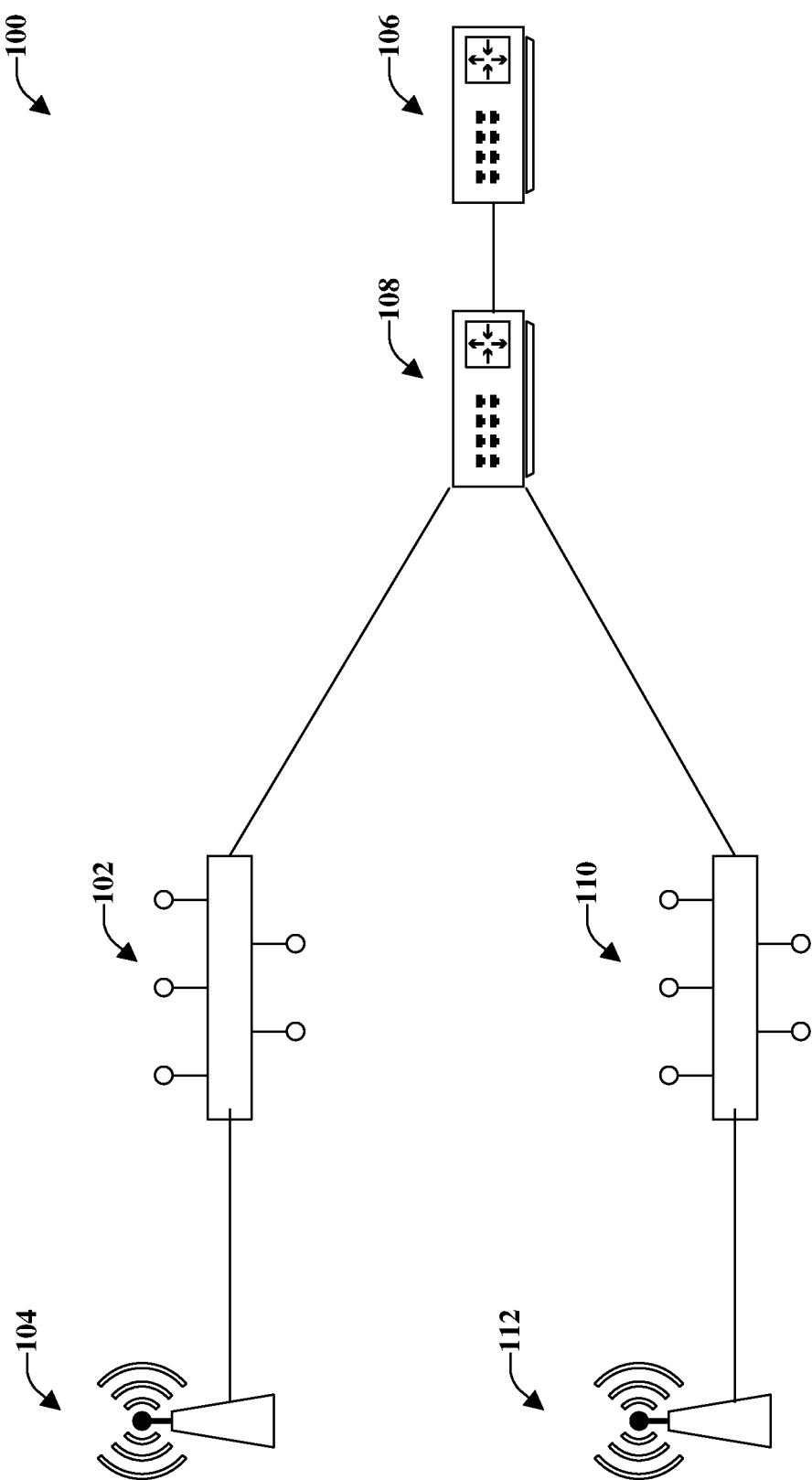
FIG. 1 illustrates an example, non-limiting, network design.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular network environment or standard).

Discussed herein are various aspects that relate to facilitating flexible transmission unit settings. The transmission unit settings can be maximum transmission unit (MTU) settings, which indicate the size of the largest network layer protocol data unit that can be communicated in a single network transaction. For example, legacy communication networks can be configured to process a relatively low MTU setting value, such as a value of 1500 MTU, 1430 MTU, and so on. In contrast, newer or updated portions of the networks can be configured to process either the same value as the legacy communication networks, or a higher MTU setting value, such as 2000 MTU, 2500 MTU, 9600 MTU, and so on. Thus, since the newer or updated communication networks can be configured to process the higher MTU setting value, such communication networks can utilize a larger packet size, which can decrease latency. Accordingly, the one or more aspects discussed herein can be utilized to increase and optimize communication network (e.g., a General Packet Radio Service (GPRS_Tunneling Protocol (GTP) network) MTU settings.

According to some implementations, a single Internet Protocol (IP) address can have multiple MTU settings, depending on a source or destination IP address. A Packet Gateway (PGW) can be configured with this capability based on a MTU to IP address logic data structure. The Radio Access Network (RAN) can communicate its MTU capability in real time back to the PGW and the PGW can ensure that the logical MTU data structure remains up to date with the most current information. When a mobility session is established, the PGW can refer to the MTU data structure and use the corresponding MTU size for the Gn/GP or S5/S8 or N3/N9 interface transport. A mobile device or user equipment (UE) can also receive the optimal MTU setting from the PGW, based on the MTU capabilities established in the logical MTU data structure.

Advantages of the various aspects provided herein, for layer 3 packet transport, can comprise: decreased latency, increased throughput, and increased router capacity. These advantages can be driven by increased layer 3 packet sizes and reduced packet fragmentation on the Gn/GP or S5/S8 or N3/N9 transport. A 5G network, for example, can be heavily influenced by latency. The current technological state of the art does not offer the degree of flexibility needed for the limited capabilities of legacy communication networks and the upgraded capabilities of newer communication networks to coexist, without the legacy communication networks holding down the newer communication networks. The various aspects discussed herein provide a way for the MTU network parameters of legacy communication networks to not hamper and hold back the MTU network parameters of the newer communication networks. Thus, when more advanced packet networks are deployed, the core packet transport parameters can be easily established to support the less advanced networks (e.g., the legacy communication networks) and the newer communication networks at the same time. In addition, when upgrading the legacy communication networks, the upgraded networks can be self-aware and can establish the optimal MTU settings for the overall network. Thereby network data packet throughput can increase, overall latency can decrease, and the routers that transport packets can have increased capacity.

In one embodiment, described herein is a system that can comprise a processor and a memory that stores executable instructions that, when executed by the processor, facilitate performance of operations. The operations can comprise receiving a first transmission unit setting from a first network device. The first transmission unit setting can indicate a size of a largest network layer protocol data unit that is able to be communicated in a single network transaction by the first network device. The operations can also comprise setting, at the device, a configuration of the first network device to the first transmission unit setting. Further, the operations can comprise sending first communication packets to the first network device using the first transmission unit setting and second communication packets to a second network device using a second transmission unit setting different from the first transmission unit setting. In an example, the first transmission unit setting can be different than a defined transmission unit setting that is common to the first network device and the second network device (e.g., a 1500 MTU setting).

In another example, sending the first communication packets to the first network device can comprise fragmenting the first communication packets to satisfy the first transmission unit setting. Further, sending the second communication packets to the second network device can comprise fragmenting the second communication packets to satisfy the second transmission unit setting.

According to an example, receiving the first transmission unit setting can comprise receiving a broadcast message from the first network device. The broadcast message can comprise a local source internet protocol address of the first network device and can be transmitted to a group of destination internet protocol addresses, comprising a destination internet protocol address of the device. Further to this example, the group of destination internet protocol addresses can be selected from a local database table (e.g., data structure) that indicates recipients of the broadcast message. Further to this example, the operations can comprise removing the local source internet protocol address of the first network device from a transmission unit logic data structure based on a determination that a defined time has elapsed since receipt of the first transmission unit setting from the first network device.

In accordance with another example, the configuration of the first network device is a first configuration of the first network device and the operations further comprise determining a third transmission unit setting for a user equipment device serviced by the first network device. The operations can also comprise facilitating a second configuration of a transmission to the user equipment device based on the third transmission unit setting. Further to this example, determining the third transmission unit setting can comprise determining a byte value associated with packet delivery limitations of a data plane path between the first network device and the user equipment device and reducing the first transmission unit setting by the byte value to derive the third transmission unit setting. Alternatively, or additionally, the operations can comprise updating the third transmission unit setting based on a determination that the user equipment device has moved from a first transmission unit zone associated with the first network device to a second transmission unit zone associated with a third network device that has a different transmission unit setting than the first transmission unit setting.

In an example, the first network device can be associated with a small cell network. Further, the third transmission unit setting can be reduced to accommodate a transmission capability of the small cell network.

According to an implementation, the first network device is a base station device and the device is a packet gateway device. Further to this implementation, receiving the first transmission unit setting from the first network device can comprise receiving the first transmission unit setting from the base station device. Further, setting the configuration of the first network device can comprise dynamically updating the packet gateway device based on the first transmission unit setting from the base station device.

According to an additional or alternative implementation, the device is a packet gateway device and the first network device is a controller device. Further to this implementation, receiving the first transmission unit setting from the first network device comprises periodically receiving a static file, from the controller device, that comprises the first transmission unit setting.

According to another embodiment, provided herein is a machine-readable storage medium that comprises executable instructions that, when executed by a processor of a network device of a wireless network, facilitate performance of operations. The operations can comprise receiving, from a first network device, a first signal that comprises a first value that represents a first transmission unit setting supported by the first network device and receiving, from a second network device, a second signal that comprises a second value that represents a second transmission unit setting supported by the second network device. The second value can be different from the first value. The operations can also comprise facilitating a first transmission of a first group of packets to the first network device based on the first value and a second transmission of a second group of packets to the second network device based on the second value.

In an example, the operations can also comprise receiving the first signal in a general packet radio service tunneling protocol user data tunneling header that comprises an extension header.

In another example, the operations can comprise determining a third value of a third transmission unit setting for a mobile device in communication with the first network device. The third value can be less than the first value. The operations can also comprise facilitating transmission of an indication, to the first network device, that comprises the third value and information indicative of an identity of the mobile device. Further to this example, the operations can comprise determining a byte value associated with packet delivery limitations of a data plane path between the first network device and the mobile device and reducing the first value by the byte value to derive the third value.

In further detail, FIG. 1 illustrates an example, non-limiting, network design 100. In accordance with conventional technology the GTP (trusted) side of a mobility network operates as an enhanced packet core to transport and connect mobile device data to the internet (untrusted) content servers in order for users, through their respective devices (e.g., mobile devices or UE) to access World Wide Web (WWW) content, to access private company enterprise data center content, and/or to access other content. As such, there are a variety of elements or parts (e.g., routers, switches, mobile radio access points, packet gateways, and so on) that comprise the trusted side of the content delivery path. A set of these elements or parts can be new (with new or updated technology) and another set of these elements can be old (with old or outdated technology). The various aspects provided herein can facilitate modernizing and/or upgrading portions of the GTP network, while maintaining in place the various elements of the legacy network. In some instances, portions of the legacy network, can be difficult, or impossible, to upgrade. However, the aspects provided herein can facilitate maximizing the speed of content delivery and reduce latency, where old and new elements or parts exist and are expected to coexist together.

According to an implementation, a flexible MTU network design is provided. The Ethernet layer 2 and IP layer 3 MTU sizes are integral components to Enhanced Packet Core (EPC) and 5G Packet Core (5GC) design that affect throughput and latency. If the packet size allowed by the MTU is too small, then the number of data packets is increased and overall data throughput is decreased. Older networks, due to the capabilities of older hardware, could typically have lower MTU than newer networks which can support jumbo frames (e.g., packet sizes that are greater than 1500 bytes and up to, and including, 9600 bytes).

In the conventional GTP network design, which many GTP data networks adhere to, the MTU setting is fixed to one value on centralized routers such as the Packet Gateway (PGW). Thus, the PGW is set to the MTU value of the lowest MTU network component of the entire end-to-end network. For example, in a very large mobility network, the layer 2 ethernet MTU capabilities, which are typically in the older parts of some geographic locations, dictate the MTU settings on the eNB Radio Access Network (RAN) and PGW network equipment, even though the eNB and PGWs can support jumbo frame settings. Even though some more recently developed ethernet switches, can support jumbo frames, the eNB and PGW cannot take advantage of this, and should set their MTU to the lowest MTU value provisioned on the oldest ethernet switches deployed.

With continuing reference to FIG. 1, in this example network 100 design, the network is limited to a MTU value of 1500. For example, a first ethernet switch 102 is deployed in a first geographic area (e.g., Alaska), illustrated as a first eNB 104, and reaches a Packet Gateway or PGW 106 in a second geographic area (e.g., Seattle). In this example, the first ethernet switch 102 has a MTU value of 1500 (e.g., 1500 MTU). As illustrated, the network traffic can also go through a serving gateway 108, which can be in a different location than the PGW 106. However, in accordance with some implementations, the PGW and the SGW can be co-located on a single device.

A second ethernet switch 110, which can be located in a third geographic area (e.g., San Francisco), illustrated as a second eNB 112, and reaches the PGW 106 in the second geographic area. In this example, the second ethernet switch 110 has a MTU value of 2000 (e.g., 2000 MTU). Although the second ethernet switch 110 has a higher MTU value, the PGW 106 is still set to 1500 MTU, which is the lowest common MTU setting of the entire network. The MTU setting on the PGW 106 is not aware of what MTU settings are on the ethernet switches (e.g., the first ethernet switch 102 and the second ethernet switch 110) because the MTU settings are statically configured (set once and can only be changed manually) on the network. For example, a command line interface it utilized to set the MTU size or value. The MTU size can be set on the user plane and, further, the RAN has a similar MTU command In conventional systems, the PGW can be provisioned with a MTU size from 1500 to 2000. Similarly, on the RAN, the UE can be configured with a MTU size from 1430 to 2000 and, usually, is lower than the size of the data plane. Therefore, if the data plane has a MTU size of 1500, the UE can be given a MTU size of 1430, which is 70 bytes lower than the data plane. The 70 bytes can account for overhead that is utilized to transmit communications to the UE. By provisioning the UE for a lower MTU size, it can mitigate or reduce the number of packets that need to be fragmented.

To overcome the above noted situation, the various aspects provided herein allow for dynamic configuration of MTU settings. Therefore, as will be discussed in further detail below, changes can be made continuously, continually, or based on other parameters. Based on these changes, the network can be automatically updated without manual intervention.

In some cases, dynamic changes of MTU settings have been attempted through the use of the IP path discovery protocol, which can be problematic in practice. For example, not every piece of network equipment supports IP path discovery, and the messages can be subject to being blocked on firewalls. Also, the dynamic nature of IP path discovery protocol can take a high toll on central processing unit (CPU) and software programing complexity, due to its dynamic nature. This can increase the financial cost so extensively, that in many cases IP path discovery is not supported on the GTP portion of networks. It is noted that various aspects provided herein do not use any portion of the logic deployed in IP path discovery protocol and do not rely on it as part of the solution.

As discussed herein, a hybrid method of static MTU settings can be implemented on the Ethernet and eNB RAN equipment along with a dynamic MTU capability on the PGW. Thus, the various aspects are not limited to only a mobility network architecture (eNB to PGW) but can be used in other network architecture implementations. However, for the purposes of explaining the various aspects, a mobility example will be used to illustrate and describe the basic concepts. This solution uniquely allows a single IP address to have multiple MTU settings, which has not been previously accomplished.

Figure 2:
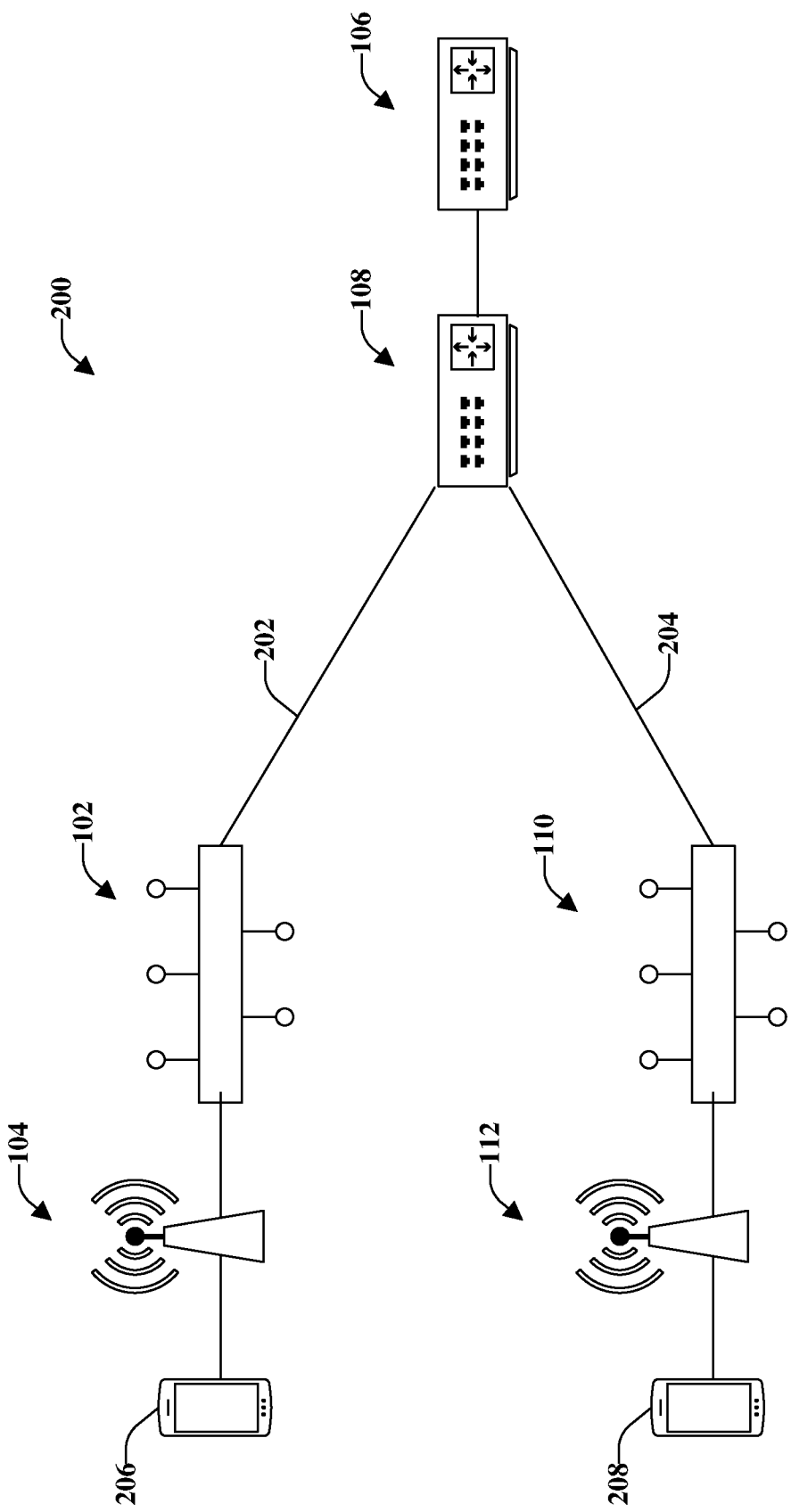
FIG. 2 illustrates an example, non-limiting, network with a flexible maximum transmission unit packet core design in accordance with one or more embodiments described herein.

FIG. 2 illustrates an example, non-limiting, network 200 with a flexible maximum transmission unit packet core design in accordance with one or more embodiments described herein. Repetitive description of like elements employed in other embodiments described herein is omitted for sake of brevity.

As discussed herein, a static MTU setting on the eNB (e.g., the first eNB 104, the second eNB 112), reflects knowledge of the MTU capabilities of the Layer 2 ethernet switches that serve its packet transport. That static setting can be received by the PGW 106, such as over GTP general packet radio service tunneling protocol (GTP) encapsulated transport. Based on receipt of the static setting, the PGW 106 can dynamically react to the MTU being advertised to it. Thus, the PGW 106 can set the PGW MTU to the optimal value serving that market.

For example, as illustrated in FIG. 2, the PGW MTU setting for the S1-U tunnel 202 that goes to the first geographic location (e.g., the first ethernet switch 102 and first eNB 104) can be set for 1500 bytes. Further, the PGW MTU setting for the S1-U tunnel 204 that goes to the third geographic location (e.g., the second ethernet switch 110 and second eNB 112) can be set to 2000 bytes. This can allow users in the second location (with the upgraded elements) to have increased data throughput and reduced latency. Prior to the changes stated above, and further described herein, the third geographic location would have to have been served by a common, static MTU setting of 1500 on the PGW 106, and thus experience reduced overall network MTU until such time that the MTU at the first geographic location could be increased to 2000, at which point the network wide MTU setting on the PGW 106 could be changed from 1500 to 2000 bytes.

It is also noted that the settings on UEs at the first geographic location and the third geographic location could be set to a value that is lower than the value of the first eNB 104 and the second eNB 112, respectively. In an example, one or more UEs 206 at the first geographic location could be set to a first value, such as MTU 1430, which provides for 70 for overhead (e.g., MTU 1500 at the first eNB 102, less 70). Further to this example, one or more UEs 208 at the third geographic location could be set to a second value, such as 1930, which provides 70 for overhead (e.g., MTU 2000 at the second eNB 112, less 70).

The one or more UEs 206, 208 can be customer location equipment, which can be equipment that is located at the customer location. The equipment could either be owned by the customer and/or by the network provider. Equipment can comprise, but is not limited to, cable television set top boxes, personal computers, IP and asynchronous transfer mode (ATM) routers, integrated access devices, mobile devices, wireless communication devices, Digital Subscriber Line (DSL), cable, and other high-speed modems.

Various aspects provided herein demonstrate a hybrid approach to have static MTU endpoints (eNB and/or other network equipment) communicate back to a dynamic MTU capable router (PGW and/or other network equipment). Network equipment is equipment that is located at the network provider location. The network equipment could either be owned by the customer and/or by the network provider. Network equipment can comprise, but is not limited to, eNB, ethernet switches, IP routers, and serving and packet gateways.

According to an implementation, multiple MTU settings can be allowed on a single source IP address. According to an alternative, or additional, implementation, "MTU advertising" of a source IP address MTU setting to destination IP addresses can be allowed. The source IP address can decide to advertise its MTU setting to all destination IP addresses, or a select few destination IP addresses, based on a local data structure that determines which destination IP addresses should receive the MTU messages.

The following provides a demonstration of a practical implementation of this concept by using GTP encapsulation protocol overhead settings. However, it is noted that the various aspects can also be used with other data protocols, or other encapsulation methods, provided the overhead is modified and designed to support the concepts discussed herein.

Figure 3:
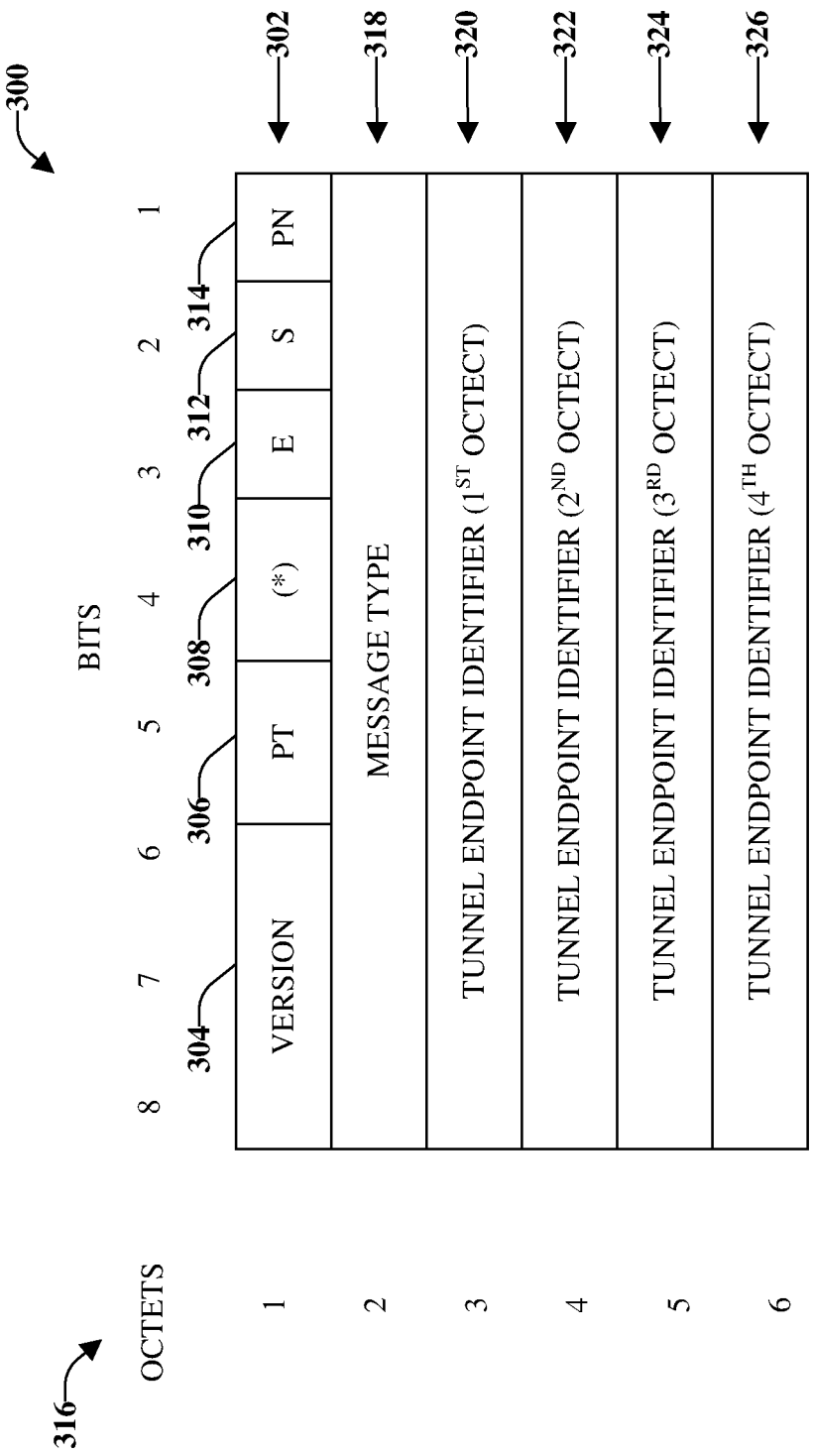
FIG. 3 illustrates a structure of a general packet radio service tunneling protocol user data tunneling header in accordance with one or more embodiments described herein.

An eNB traditionally communicates to a PGW using the GTP protocol through a packet data network designed for S5/S8 transport. The conventional GTP protocol overhead, as defined by the 3GPP specification, and implemented by many mobility network carriers, is depicted in FIG. 3, which illustrates a 3GPP structure 300 of GTP-U header.

The 3GPP structure 300 can comprise a general packet radio service tunneling protocol user data tunneling header or GTP-U header 302, which can be a variable length header whose minimum length is 8 bytes. The GTP-U header 302 can comprise a version field 304 (used to determine the version of the GTP-U protocol), a Protocol Type or PT field 306, a reserved field 308, an extension header or E flag 310 (used to signal the presence of the Extension Header field), a sequence number flag or S flag 312 (used to signal the presence of the GTP Sequence Number field), and a N-PDU number flag or PN flag 314 (used to signal the presence of N-PDU Numbers).

The octets 316 indicate the length of the payload (e.g., the balance of the packet following the mandatory portion of the GTP header (e.g., the first 8 octets)). A message type field 318 indicates the type of GTP-U message. Also illustrated are four tunnel endpoint identifiers (TEIDs), namely TEID (first Octect) 320, TEID (second Octect) 322, TEID (third Octect) 324, and TEID (fourth Octect) 326. The TEID unambiguously identifies a tunnel endpoint in the receiving GTP-U protocol entity.

As illustrated, in Octet 2 there exists a message type that provides instruction for the network equipment related to how to set up various signaling (control plane) messages across the user plane (data plane) tunnel, setup of the user plane tunnel, and user data plane messages. The 8-bit value present in the message type defines what the GTP-U packet will be used for. As an example, message type 255 can indicate the packets are to be used for standard user plane messages (G-PDU), while message type 26 can be used for error indications, message type 31 can be used to indicate an extension of the GTP-U protocol, messages 16 and 17 can be used for creating PDP contexts, and messages 1 and 2 can be used for echo request and response. This large suite of messages is defined in several 3GPP standards, including, for example, TS 29.281, TS 29.060, and TS 32.295. It is noted that although specific message types are discussed, the disclosed aspects are not limited to these specific message types and other message types can be utilized with the disclosed aspects.

Figure 4:
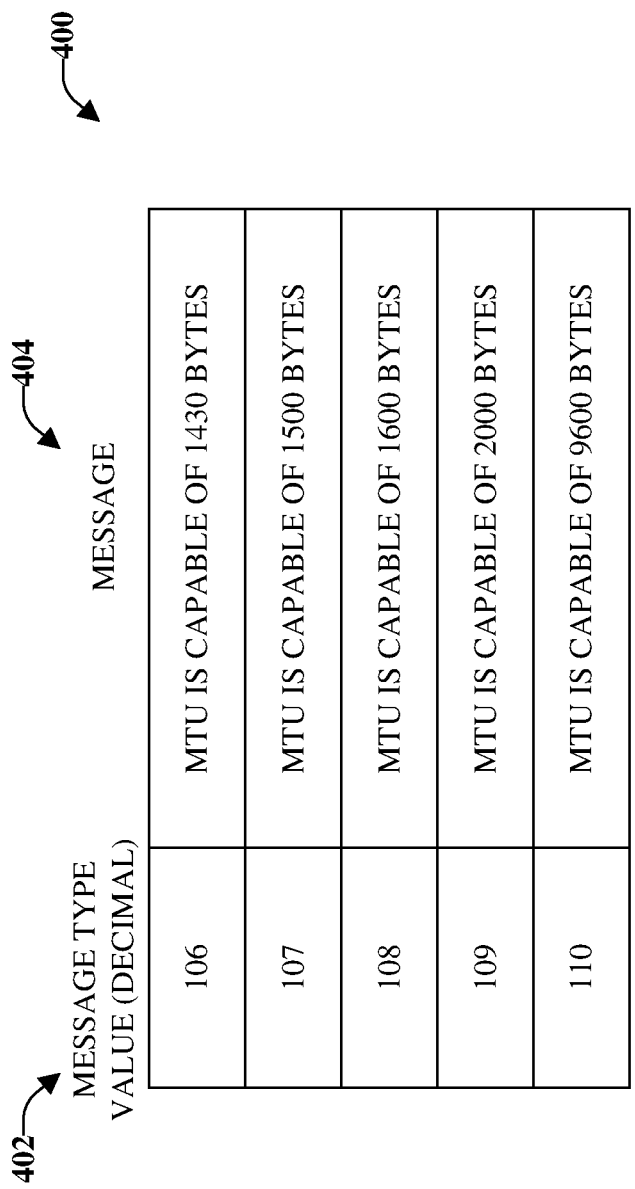
FIG. 4 illustrates an example, non-limiting, data structure of maximum transmission unit signaling messages that can be utilized with the disclosed aspects.

It is noted that for the various aspects discussed herein, not all messages are currently defined in 3GPP and are reserved for future use. As an example of an illustration of the concept described herein, the unused Messages Type(s) 106 to 110 are proposed for use with the disclosed aspects. These five messages can be used as "MTU Control Messages" in order to send the MTU size from the RAN (eNB) to the EPC (PGW) and thereby identify the specific MTU a RAN access network can support. For example, FIG. 4 illustrates an example, non-limiting, data structure 400 of MTU signaling messages that can be utilized with the disclosed aspects.

As illustrated, the data structure 400 can comprise a message type value field 402 (which can be expressed in decimals) and a message field 404. A message type 106 can indicate a MTU size of 1430 (which can better support micro cells that use additional overhead for ESP encapsulation), message type 107 can indicate a MTU size of 1500, message type 108 can indicate a MTU size of 1600, message type 109 can indicate MTU sizes of 2000, and message type 110 can indicate a MTU size of 9600.

It is noted that the various aspects provided herein are not limited to these particular message type values 402 and messages 404, which are solely provided for purposes of explaining the disclosed aspects. According to some implementations, less than five messages or more than five messages can be utilized. However, it is noted that five messages can provide sufficient coverage for quarantining legacy MTU networks, emancipating current network equipment capabilities (as will be discussed with respect to FIG. 11 below), and allowing for future MTU evolution. It can also resolve various challenges experienced in micro small cell RAN, with excessive packet fragmentation caused by the use of 70 additional bytes used for Encapsulating Security Payload (ESP) security encapsulation.

As an example of the use of the MTU control messages described herein, in FIG. 2, the first geographic location (e.g., Alaska) could send a GTP-U message for 107, periodically or based on another time interval, or as a follow up to the creation of a TEID user plane tunnel, e.g., if the eNB and associated Ethernet backhaul can only support 1500 byte packets. Similarly, the third geographic location (e.g., San Francisco) could send GTP-U message 109, periodically or based on another time interval, or as a follow up to the creation of a TEID user plan tunnel, e.g., if the eNB and associated Ethernet backhaul can only support 2000 byte packets.

To periodically (or based on another time interval) send the Message/MTU size allows the eNB to put in a new MTU size later when the Layer 2 Ethernet Backhaul or small cell back haul can support a higher MTU. In this case, the PGW can receive the MTU update automatically, and update the MTU data structure retained by the PGW accordingly.

The Packet Gateway (PGW) can have a logical MTU index data structure, whereby the PGW can keep track of which RAN (eNB) can support what specific MTU size. The PGW can therefore, send only packets of the size that the RAN can support, and not any larger. This capability can reduce packet fragmentation and can reduce packet latency, thus leading to faster World Wide Web (WWW) browsing, or otherwise faster data transfer with increased packet size. According to some implementations, the PGW can auto summary the IP address in order to reduce the size of the logical MTU index data structure, which can become quite large, especially when small cells are included.

Figure 5:
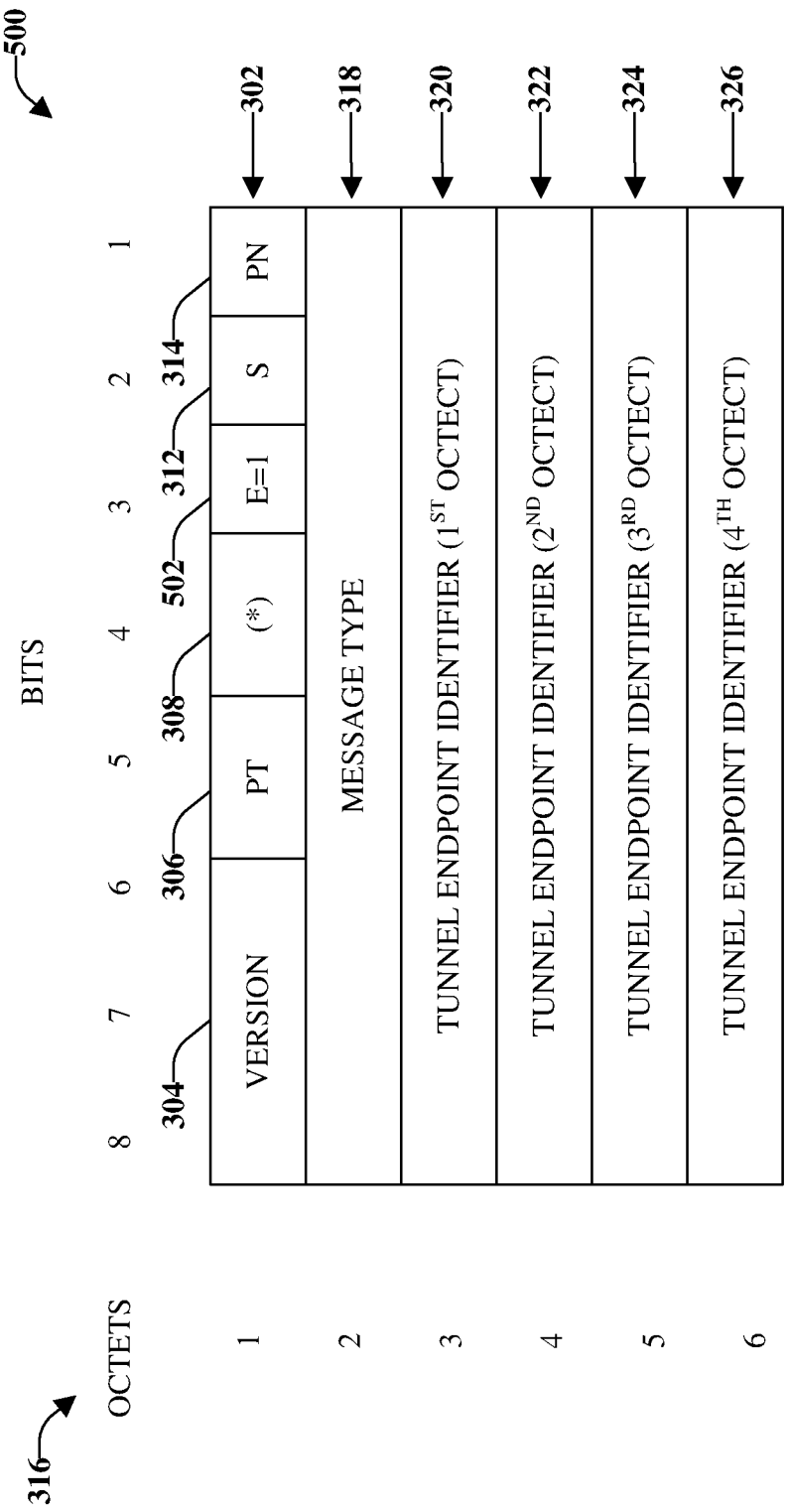
FIG. 5 illustrates an example, non-limiting, structure of a general packet radio service tunneling protocol user data tunneling header using extension header in accordance with one or more embodiments described herein.

Other delivery methods of the MTU, using GTP, are possible other than the one described in detail thus far. An example of this is using the GTP extension header. FIG. 5 illustrates an example, non-limiting, structure of a GTP-U header using extension header in accordance with one or more embodiments described herein. Repetitive description of like elements employed in other embodiments described herein is omitted for sake of brevity.

Figure 6:
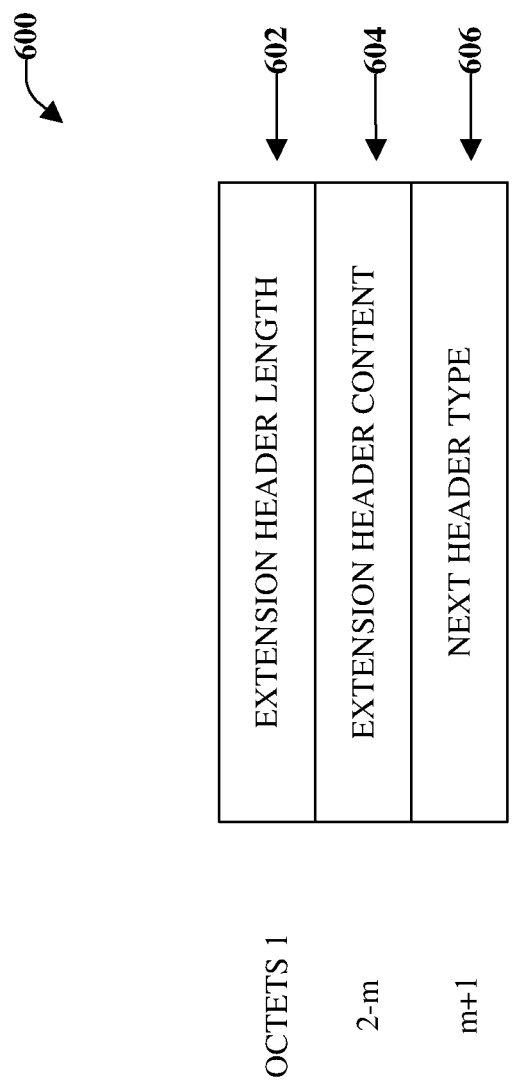
FIG. 6 illustrates an outline of an extension header format in accordance with one or more embodiments described herein.

As illustrated in FIG. 5, when using the extension header, the third bit of Octet 1 (e.g., the E flag 502) can be set to "1". This is per the 3GPP TS 29.281 standard. The third bit of Octet 1 informs the downstream GTP receiver that the extension header is being used. The local transmit MTU value would then have to be contained in the extension header content, in Octet 2-m, as depicted in FIG. 6, which illustrates an outline of an extension header format 600 in accordance with one or more embodiments described herein. As illustrated, the extension header format 600 can comprise an extension header length 602, an extension header content 604, and a next extension header type 606. The extension header content 604 could be as simple as a string that indicates "MTU is 1500", but, in implementation, could be more complicated.

Implementation of the extension header content method adds additional bytes to the GTP tunnel overhead and is a possible MTU delivery method. This could be implemented if potential problems are encountered with the MTU signaling message. However, it is noted that the MTU signaling message method does not increase the GTP overhead that is currently in use.

Figure 7:
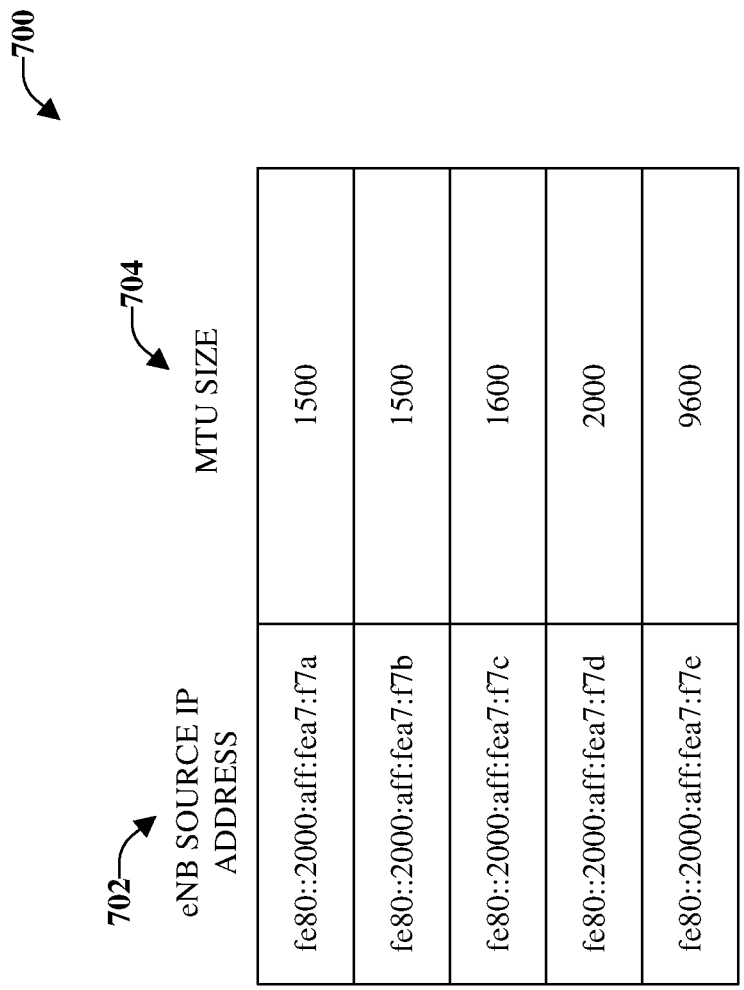
FIG. 7 illustrates an example, non-limiting, logical maximum transmission unit data structure that can associate respective maximum transmission units with source internet protocol addresses in accordance with one or more embodiments described herein.

FIG. 7 illustrates an example, non-limiting, logical maximum transmission unit data structure 700 that can associate respective maximum transmission units with source internet protocol addresses in accordance with one or more embodiments described herein. Repetitive description of like elements employed in other embodiments described herein is omitted for sake of brevity.

Illustrated in the first column 702 are eNB source IP addresses and in the second column 704 are respective MTU sizes. In this case, the PGW receives the eNB, or micro cell, MTU control message and correlates them to the source IP of the RAN. Thereby a PGW logical MTU data structure can be constructed that comprises details related to what MTU should be assigned for any date traffic going to any RAN IP address. This concept allows for one IP address to have multiple MTU settings. Thereby old and new networks can be served with the optimal MTU settings needed for optimal data transport.

With the PGW having a logical MTU data structure, it can further allow the PGW to establish and send an optimal MTU setting to a User Equipment (UE). This also has added benefit for reducing packet fragmentation and thereby decreasing latency. The MTU size could be correctly sized for the RAN market in which the user (e.g., the UE) is authenticated. This can be accomplished by using protocol configuration options (PCOs) that the PGW uses in the Create Session Request (CSR) that provides a UE with information related to what MTU setting the UE should use for the duration of a session. For example, using FIG. 2, the PGW 106 can instruct the UE to use 1430 in Alaska, and 1930 in San Francisco (e.g., as the UE changes its location). Since the worst case GTP overhead is less than 70 bytes, using IPv6 transport, the UE can be using the maximum packet size that is possible for the RAN (eNB) serving it.

RAN can have increased overhead, when employing additional encrypted security encapsulation, such as for micro cells where the packet backhaul usually occurs over 1500 layer 3 MTU networks. These applications can have less than 70 additional bytes of overhead that is needed for the ESP security encapsulation. In this particular case, the PGW can be also capable of taking that additional ESP overhead into account. For example, a micro cell can set its MTU to 1430, to reflect the 70 bytes of ESP overhead needed, and the PGW can send any UE attaching to it, via the PCO option, a UE MTU size of 1360 (e.g., 1430 minus the 70 bytes used for S5/S8 transport overhead). This can increase data throughput and reduce latency for all UEs being served in a micro cell environment.

The MTU control messages can be sent from the RAN (micro cells and eNB) to the centralized router (PGW) at periodic intervals. For example, on an hourly basis or at another interval. As the access network evolves and the eNB access network can support a higher MTU setting, the eNB can re-provision the MTU setting to the higher value and the PGW can automatically detect and use the increased MTU setting the next time the control message is sent.

According to some implementations, an alternative method of a PGW MTU data structure can include using the TEID of the S1-U tunnel. FIG. 8 demonstrates this approach and illustrates an example, non-limiting, MTU data structure 800 that tracks MTU network capability in accordance with one or more embodiments described herein. The MTU data structure 800 comprises a first column for a tunnel endpoint identifier or TEID 802 and a second column for the MTU size 804 corresponding to the TEID.

Each mobility session can be associated with a TEID used on the S1-U tunnel. This can be used to correlate the eNB MTU value to the PGW session serving it. Here, the eNB can send the MTU signaling message to the PGW as a follow up to any new session created with a TEID.

In this approach, as well, MTU can be automatically updated if the RAN provisions new MTU values. The MTU control message can simply contain the new MTU values that are sent as part of the establishment of the S1-U TEID. Using the IPv6 address of the eNB can be utilized and would not require an existing S1-U tunnel between the eNB and PGW.

According to additional or alternative implementations, other options are also available to create an IP interface that has multiple MTU settings based on source and/or destination IP address. In accordance with a first example is an implementation where the eNB RAN IP provides its MTU to the PGW IP address via GTP messages. The allowed creation of a PGW MTU data structure that could associate its destination IP address with the MTU of that specific RAN AP.

According to a second example, a master software program can be aware of, and can be kept up to date, with the packet size capabilities of the entire network. This software controller, such as ECOMP (Enhanced Control, Orchestration, Management and Policy) or controller device, can provide a static MTU map to a master router, such as a PGW, in a file format, whereby the PGW implements this file as its logical MTU data structure. As the network MTU capabilities evolve, then a new file is sent from ECOMP to the PGW. This is an example of a static update to the PGW, if it occurred at fixed intervals. If ECOMP pushed a new MTU data structure to the PGW, in real time, as network packet size (MTU capabilities) changes are made, then this would be an example of a dynamic PGW update. The difference between the two implementation examples (the first example and the second example), is that in the first example, the local IP destination endpoints are providing the MTU information and updates to the central PGW, whereby each endpoint is instructing the PGW. In the second example, a centralized controller, or orchestrator, entity is providing the update. As such, it is one entity, rather than the many entities that are used in the first example. The various aspects provided herein can be utilized with various implementations, as demonstrated in the first example and the second example, such that a single IP interface can be aware of multiple MTU settings based on prior knowledge of a networks packet delivery capability.

Yet, another implementation of passing the edge networks MTU value, for example from an eNB, MTU back to a centralized router, for example a PGW, can rely on using a control plane to relay the message. A benefit of this approach can be to send MTU updates back to the PGW, in a faster, and more organized manner, which could better cover mobility events.

Since there are typically more network elements involved in the transfer of a GTP-C message in a mobility network (eNB, MME, PGW), implementation can be costlier and time consuming In addition, the details of the structure of the GTP-C control message would be utilized. Traditionally, new elements are contained in an "Information Element" (IE). Therefore, an implementation of a flexible MTU design can be to pass the eNB MTU value as part of an IE, during a mobility session attach, or Inter Radio Exchange (IRAT) hand off, through a MME, to the PGW. Thus, the PGW can become aware of the MTU value that the session can support. The PGW can thus be sent the most optimized MTU value (for example the MTU provided by the eNB minus the 70 bytes needed for GTP overhead), to a mobile phone. Thus, the MTU value for the network can be optimal and can reduce overall latency, increase throughput, and optimize router packet transfers through reduced packet fragmentation.

A further implementation can be to send the UE MTU updates as the UE goes through various parts of the legacy and modern (emancipated) network through radio exchange of the radio Access Points (AP) via IRATs. This can provide real time MTU updates. In this approach, the control plane can be establishing the MTU of the Data Plane (S1-U).

In an example, the existing 3GPP TS23.401 attach call flows do not change. For example, for a 4G attach, the TS23.401 flow can still apply. The difference is that the new MTU IE is now handed off during step 2 from the eNodeB to the MME, which comprises the new MTU IE handoff to the Serving GW and PDN SGW (e.g., in steps 12 and 13 of the TS23.401 flow). The PGW may send a different MTU PCO value in step 16 of the TS23.401 flow (Create Session Response), based on the MTU knowledge it obtained in step 13 of the TS23.401 flow (Create Session Request). This allows for MTU to be optimized end-to-end.

For the data plane S1-U implementation of MTU control messages, the PGW to RAN AP logical MTU data structure can have a time out value of optional setting. An example of this would be if no MTU control message is received by the PGW in a defined interval (e.g., a twenty-four-hour period), the source AP IP address and associated MTU entry can be removed from the logic data structure.

Figure 9:
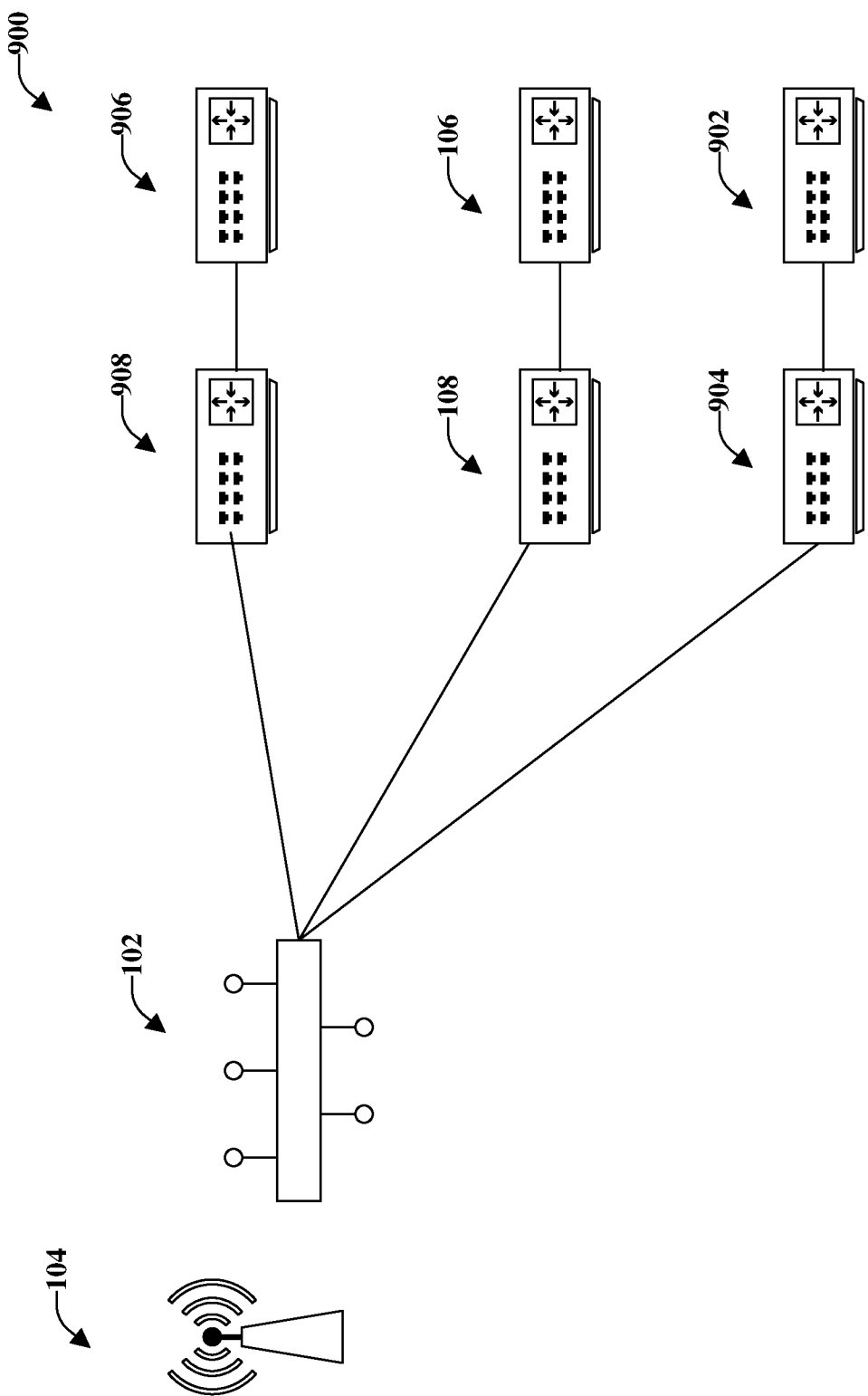
FIG. 9 illustrates an example, non-limiting, representation of a radio access network access point that connects to multiple packet gateways in accordance with one or more embodiments described herein.

According to an implementation, a RAN AP does not have a list of PGWs it can connect to. Instead, the RAN IP discovers the PGWs as mobile sessions are established. In the network, there are multiple PGWs that an individual RAN AP can connect to. FIG. 9 illustrates an example, non-limiting, representation of a radio access network access point that connects to multiple packet gateways in accordance with one or more embodiments described herein. Repetitive description of like elements employed in other embodiments described herein is omitted for sake of brevity.

As illustrated, the first ethernet switch 102 (in a first geographic area, such as Alaska) can connect to various SGWs and PGWs. As illustrated, a first connection can be to SGW 108 and PGW 106 in a second geographic area (e.g., Seattle). A second connection can be to a second PGW 902 and second SGW 904 in a third geographic location (e.g., San Francisco). Further, a third connection (e.g., a new connection) can be established to a third PGW 906 (e.g., a new PGW) and a third SGW 908 (e.g., new SGW) located in a new or fourth geographic area (e.g., British Columbia). For the first call from a RAN AP to a third PGW 906, the third PGW 906 will not know what MTU to assign the S1-U tunnel or the mobile phone, since it will not have an entry yet for the source IP address in the PGW logical MTU data structure. (e.g., it will not have received a MTU control message since the RAN APN is unaware of the PGW IP address). In this case, if no IP address exists in the data structure, the PGW can assign a default value of 1500 for the S1-U tunnel MTU. The RAN AP can retain a data structure of all the PGWs determined to exist in the network and can access that list on the periodic interval defined, in order to send each PGW the MTU control message.

The following discusses MTU updates during a tracking area update. A solution to the "handover" problem from an eNB with jumbo MTU support to an eNB without (assuming they are in different tracking areas) can involve an indication of the supported MTU from the new eNB to the MME in the Tracking Area Update (TAU) request. The MME could then send a modify bearer request with a new information element value that informs the SGW and PGW of the new MTU and allows the PGW to adjust the size if necessary.

Figure 10:
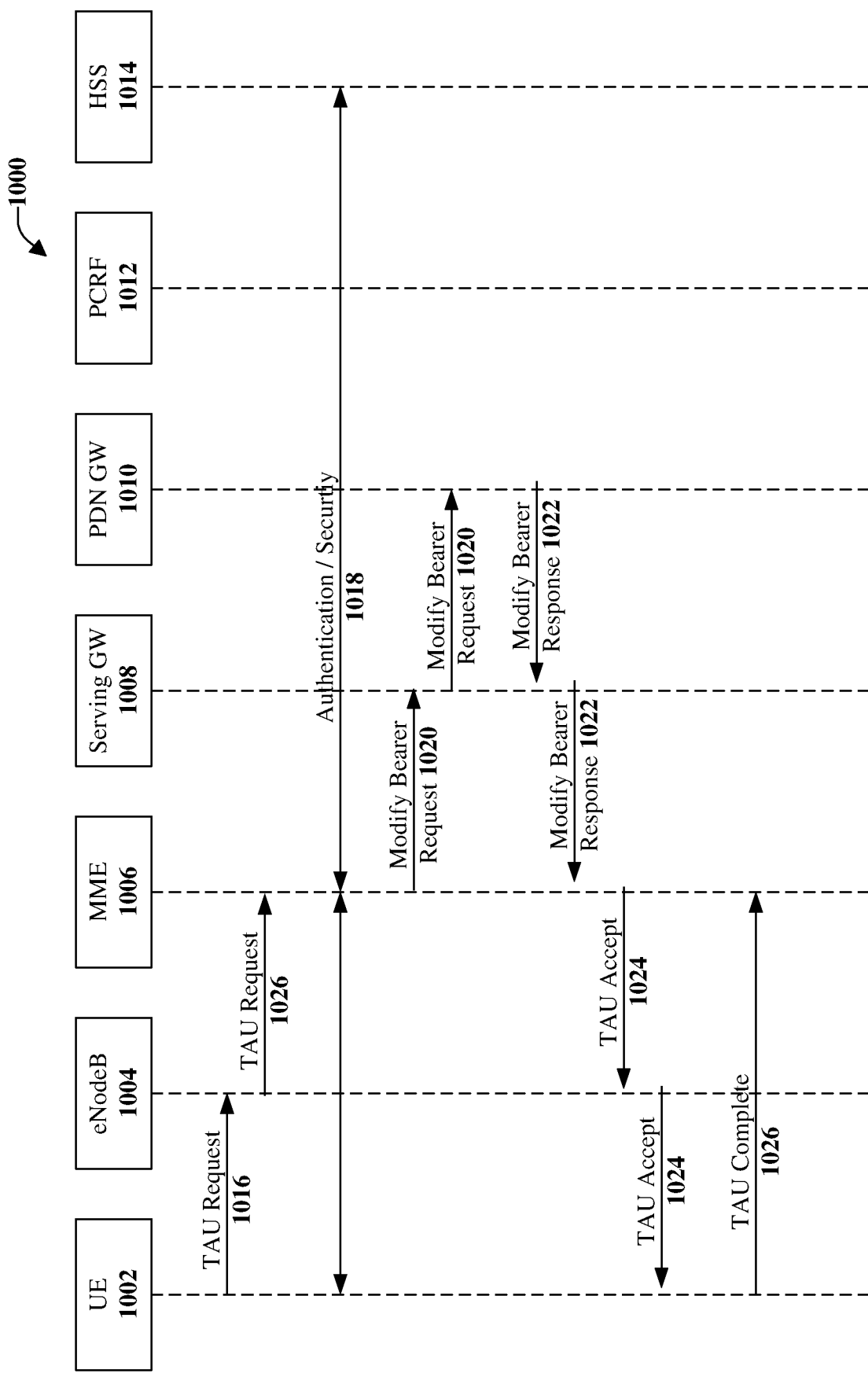
FIG. 10 illustrates an example, non-limiting, signaling flow for a periodic tracking area update in accordance with one or more embodiments described herein.

FIG. 10 illustrates an example, non-limiting, signaling flow 1000 for a periodic tracking area update in accordance with one or more embodiments described herein. It is noted that this signaling flow 1000 can also apply to any TAU with no MME or SGW change. Illustrated are representations of a UE 1002, a eNodeB 1004, a MME 1006, a serving gateway 1008, a PDN gateway 1010, a PCRF 1012, and a HSS 1014.

A tracking area update (TAU) request 1016 can be sent from the UE 1002 to the eNodeB 1004 and forwarded to the MME 1006. Authentication/security 1018 can be performed based on the TAU request 1016. A modify bearer request 1018 can be sent from the MME 1006 to the serving gateway 1008 and forwarded to the PDN gateway 1002. The PDN gateway 1002 can respond with a modify bearer response 1020, which can be forwarded to the MME 1006. Thereafter, a TAU accept message 1022 can be transferred from the MME 1006 to the UE 1002, through the eNodeB 1004. Then an indication of completion of the tracking area update 1024 can be transmitted from the UE 1002 to the MME 1006. (A more complete description can be found in Section 5.3.3.2 in 3GPP TS 23.401 version 15.1 "Tracking Area Update Process").

According to the various aspects provided herein, the flow of FIG. 10 can be modified to comprise the eNodeB forwarding the TAU request to the MME, as indicated at 1026. The TAU contents can be defined as indicated in 3GPP TS 24.301, according to some implementations.

Table 1 below provides example, non-limiting, tracking area update request message content according to one or more embodiments provided herein. As indicated in Table 1, according to one or more aspects, a new information element (IE) called "MTU Supported" can be inserted as an Optional IE in the TAU Request to the MME.

TABLE 1

| IEI | Information Element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Tracking area update request message identity | Message type 9.8 | M | V | 1 |
| | EPS update type | EPS update type 9.9.3.14 | M | V | ½ |
| | NAS key set identifier | NAS key set identifier 9.9.3.21 | M | V | ½ |
| | Old GUTI | EPS mobile identity 9.9.3.12 | M | LV | 12 |
| B- | Non-current native NAS key set identifier | NAS key set identifier 9.9.3.21 | O | TV | 1 |
| 8- | GPRS ciphering key sequence number | Ciphering key sequence number 9.9.3.4a | O | TV | 1 |
| 19 | Old P-TMSI signature | P-TMSI signature 9.9.3.26 | O | TV | 4 |
| 50 | Additional GUTI | EPS mobile identity 9.9.3.12 | O | TLV | 13 |
| 55 | Nonce$_{UE}$ | Nonce 9.9.3.25 | O | TV | 5 |
| 58 | UE network capability | UE network capability 9.9.3.34 | O | TLV | 4-15 |
| 52 | Last visited registered TAI | Tracking area identity 9.9.3.32 | O | TV | 6 |
| 5C | DRX parameter | DRX parameter 9.9.3.8 | O | TV | 3 |
| A- | UE radio capability information update needed | UE radio capability information update needed 9.9.3.35 | O | TV | 1 |
| 57 | EPS bearer context status | EPS bearer context status 9.9.2.1 | O | TLV | 4 |
| 31 | MS network capability | MS network capability 9.9.3.20 | O | TLV | 4-10 |
| 13 | Old location area identification | Location area identification 9.9.2.2 | O | TV | 6 |
| 9- | TMSI status | TMSI status 9.9.3.31 | O | TV | 1 |
| 11 | Mobile station classmark 2 | Mobile station classmark 2 9.9.2.4 | O | TLV | 5 |
| 20 | Mobile station classmark 3 | Mobile station classmark 3 9.9.2.5 | O | TLV | 2-34 |

TABLE 1-continued

| | | | | | |
|---|---|---|---|---|---|
| 40 | Supported Codecs | Supported Codec List 9.9.2.10 | O | TLV | 5-n |
| F- | Additional update type | Additional update type 9.9.3.0B | O | TV | 1 |
| 5D | Voice domain preference and UE's usage setting | Voice domain preference and UE's usage setting 9.9.3.44 | O | TLV | 3 |
| E- | Old GUTI type | GUTI type 9.9.3.45 | O | TV | 1 |
| D- | Device properties | Device properties 9.9.2.0A | O | TV | 1 |
| C- | MS network feature support | MS network feature support 9.9.3.20A | O | TV | 1 |
| 10 | TMSI based NRI container | Network resource identifier container 9.9.3.24A | O | TLV | 4 |
| 6A | T3324 value | GPRS timer 2 9.9.3.16 | O | TLV | 3 |
| 5E | T3412 extended value | GPRS timer 3 9.9.3.16B | O | TLV | 3 |
| 6E | Extended DRX parameters | Extended DRX parameters 9.9.3.46 | O | TLV | 3 |
| ?? | MTU Supported | See below | O | TV | 1 |

| 8 | 7 | 6 | 5 | 4 | 3 | 2 | 1 | |
|---|---|---|---|---|---|---|---|---|
| MTU Supported IEI | | | | MTU Size | | | | Octet 1 |

The MTU Size values can range from 0 to 15. For example, the size and values are indicated in Table 2 below.

TABLE 2

| Size | Values |
|---|---|
| 0 (default) | 1500 |
| 1 | 1430 |
| 2 | 1600 |
| 3 | 2000 |

TABLE 2-continued

| Size | Values |
|---|---|
| 4 | 9600 |
| 5-15 | Future Use |

The MME can then send a modify bearer request to the S/PGW (Step 9). The IEs included are as indicated in Table 3 below:

TABLE 3

| Information elements | P | Condition/Comment | IE Type | Ins. |
|---|---|---|---|---|
| ME Identity (MEI) | C | This IE shall be sent on the S5/S8 interfaces for the Gn/Gp SGSN to MME TAU. | MEI | 0 |
| User Location Information (ULI) | C | The MME/SGSN shall include this IE for TAU/RAU/Handover procedures if the PGW has requested location information change reporting and MME/SGSN support location information change reporting. An MME/SGSN which supports location information change shall include this IE for UE-initiated Service Request procedure if the PGW has requested location information change reporting and the UE's location info has changed. The SGW shall include this IE on S5/S8 if it receives the ULI from MME/SGSN. | ULI | 0 |
| | CO | This IE shall also be included on the S4/S11 interface for a TAU/RAU/Handover with MME/SGSN change without SGW change procedure, if the level of support changes. The MME shall include the ECGI/TAI in the ULI, the SGSN shall include the CGI/SAI in the ULI. The SGW shall include this IE on S5/S8 if it receives the ULI from MME/SGSN. | | |
| Serving Network | C | This IE shall be sent on S5/S8 for a TAU with an associated MME change and the SGW change. | Serving Network | 0 |
| | CO | This IE shall be included on S5/S8 for a RAU/Handover with an associated SGSN/MME change and SGW change. | | |

TABLE 3-continued

| Information elements | P | Condition/Comment | IE Type | Ins. |
|---|---|---|---|---|
| RAT Type | C | This IE shall be sent on the S11 interface for a TAU with anSGSN interaction, UE triggered Service Request or an I-RAT Handover. This IE shall be sent on the S5/S8 interface for a change of RAT type. This IE shall be sent on the S4 interface for a RAU with MME interaction, a RAU with an SGSN change, a UE Initiated Service Request or an I-RAT Handover. | RAT Type | 0 |
| Indication Flags | C | This IE shall be included if any one of the applicable flags is set to 1. Applicable flags are: ISRAI: This flag shall be used on S4/S11 interface and set to 1 if the ISR is established between the MME and the S4 SGSN. Handover Indication: This flag shall be set for an E-UTRAN Initial Attach or for a UE Requested PDN Connectivity, if the UE comes from a non-3GPP access. Direct Tunnel Flag: This flag shall be used on the S4 interface and set to 1 if Direct Tunnel is used. Change Reporting support Indication: shall be used on S4/S11, S5/S8 and set if the SGSN/MME supports location Info Change Reporting. This flag should be ignored by SGW if no message is sent on S5/S8. Change F-TEID support Indication: This flag shall be used on S4/S11 for an IDLE state UE initiated TAU/RAU procedure and set to 1 to allow the SGW changing the GTP-U F-TEID. | Indication | 0 |
| Sender F-TEID for Control Plane | C | This IE shall be sent on the S11 and S4 interfaces for a TAU/RAU/Handover with MME/SGSN change and without any SGW change. This IE shall be sent on the S5 and S8 interfaces for a TAU/RAU/Handover with a SGW change. | F-TEID | 0 |
| Aggregate Maximum Bit Rate (APN-AMBR) | C | The APN-AMBR shall be sent for the PS mobility from the Gn/Gp SGSN to the S4 SGSN/MME procedures. | AMBR | 0 |
| Delay Downlink Packet Notification Request | C | This IE shall be sent on the S11 interface for a UE triggered Service Request. | Delay Value | 0 |
| Bearer Contexts to be modified | C | This IE shall not be sent on the S5/S8 interface for a UE triggered Service Request. When Handover Indication flag is set to 1 (i.e., for EUTRAN Initial Attach or UE Requested PDN Connectivity when the UE comes from non-3GPP access), the PGW shall ignore this IE. See NOTE 1 Several IEs with the same type and instance value may be included as necessary to represent a list of Bearers to be modified. | Bearer Context | 0 |
| Bearer Contexts to be removed | C | This IE shall be included on the S4 and S11 interfaces for the TAU/RAU/Handover and Service Request procedures where any of the bearers existing before the TAU/RAU/Handover procedure and Service Request procedures will be deactivated as consequence of the TAU/RAU/Handover procedure and Service Request procedures. For each of those bearers, an IE with the same type and instance value, shall be included. | Bearer Context | 1 |
| Recovery | C | This IE shall be included if contacting the peer for the first time | Recovery | 0 |
| UE Time Zone | O | This IE may be included by the MME on the S11 interface or by the SGSN on the S4 interface. | UE Time Zone | 0 |
| | C | If SGW receives this IE, SGW shall forward it to PGW across S5/S8 interface. | | |
| MME-FQ-CSID | C | This IE shall be included by MME on S11 and shall be forwarded by SGW on S5/S8 according to the requirements in 3GPP TS 23.007 [17]. | FQ-CSID | 0 |

TABLE 3-continued

| Information elements | P | Condition/Comment | IE Type | Ins. |
|---|---|---|---|---|
| SGW-FQ-CSID | C | This IE shall be included by SGW on S5/S8 according to the requirements in 3GPP TS 23.007 [17]. | FQ-CSID | 1 |
| MTU Supported | C | This IE shall be included when the MTU size supported by the eNodeB is larger than the default size of 1500 (value = 0) and may be included if the value is 0 (default). This IE shall be included by SGW on S5/S8 whenever present | | |
| Private Extension | O | | Private Extension | VS |

NOTE 1:
This requirement is introduced for backwards compatibility reasons. If Bearer Contexts to be modified IE(s) is received in the Modify Bearer Request message, the PGW shall include corresponding Bearer Contexts modified IE(s) in the Modify Bearer Response message.

The PGW can respond to the modify bearer request by sending a modify bearer response with PCO indicating a new mobile subscriber MTU IPv4 or IPv6 Link MTU value.

The MME would then inform the eNodeB of the selected MTU value in the TAU Accept Message. It can map the MTU size to one of the values defined earlier (e.g., 0 or 1) and comprise the MTU Support IE in the TAU Accept message.

TABLE 4

| IEI | Information Element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Tracking area update accept message identity | Message type 9.8 | M | V | 1 |
| | EPS update result | EPS update result 9.9.3.13 | M | V | ½ |
| | Spare half octet | Spare half octet 9.9.2.9 | M | V | ½ |
| 5A | T3412 value | GPRS timer 9.9.3.16 | O | TV | 2 |
| 50 | GUTI | EPS mobile identity 9.9.3.12 | O | TLV | 13 |
| 54 | TAI list | Tracking area identity list 9.9.3.33 | O | TLV | 8-98 |
| 57 | EPS bearer context status | EPS bearer context status 9.9.2.1 | O | TLV | 4 |
| 13 | Location area identification | Location area identification 9.9.2.2 | O | TV | 6 |
| 23 | MS identity | Mobile identity 9.9.2.3 | O | TLV | 7-10 |
| 53 | EMM cause | EMM cause 9.9.3.9 | O | TV | 2 |
| 17 | T3402 value | GPRS timer 9.9.3.16 | O | TV | 2 |
| 59 | T3423 value | GPRS timer 9.9.3.16 | O | TV | 2 |
| 4A | Equivalent PLMNs | PLMN list 9.9.2.8 | O | TLV | 5-47 |
| 34 | Emergency number list | Emergency number list 9.9.3.37 | O | TLV | 5-50 |
| 64 | EPS network feature support | EPS network feature support 9.9.3.12A | O | TLV | 3 |
| F- | Additional update result | Additional update result 9.9.3.0A | O | TV | 1 |
| 5E | T3412 extended value | GPRS timer 3 9.9.3.16B | O | TLV | 3 |
| 6A | T3324 value | GPRS timer 2 9.9.3.16A | O | TLV | 3 |
| 6E | Extended DRX parameters | Extended DRX parameters 9.9.3.46 | O | TLV | 3 |

TABLE 4-continued

| IEI | Information Element | Type/Reference | Presence | Format | Length |
|---|---|---|---|---|---|
| 68 | Header compression configuration status | Header compression configuration status 9.9.4.27 | O | TLV | 4 |
| 65 | DCN-ID | DCN-ID 9.9.3.48 | O | TLV | 4 |
| ?? | MTU Supported | See prior explanation | O | TV | 1 |

If the eNodeB receives a different MTU size than the MTU size it provided in the TAU request, the eNodeB uses the MTU size it receives from the PGW and should provide that update to the UE. Otherwise the eNodeB defaults to 1500 if the IE is missing.

Figure 11:
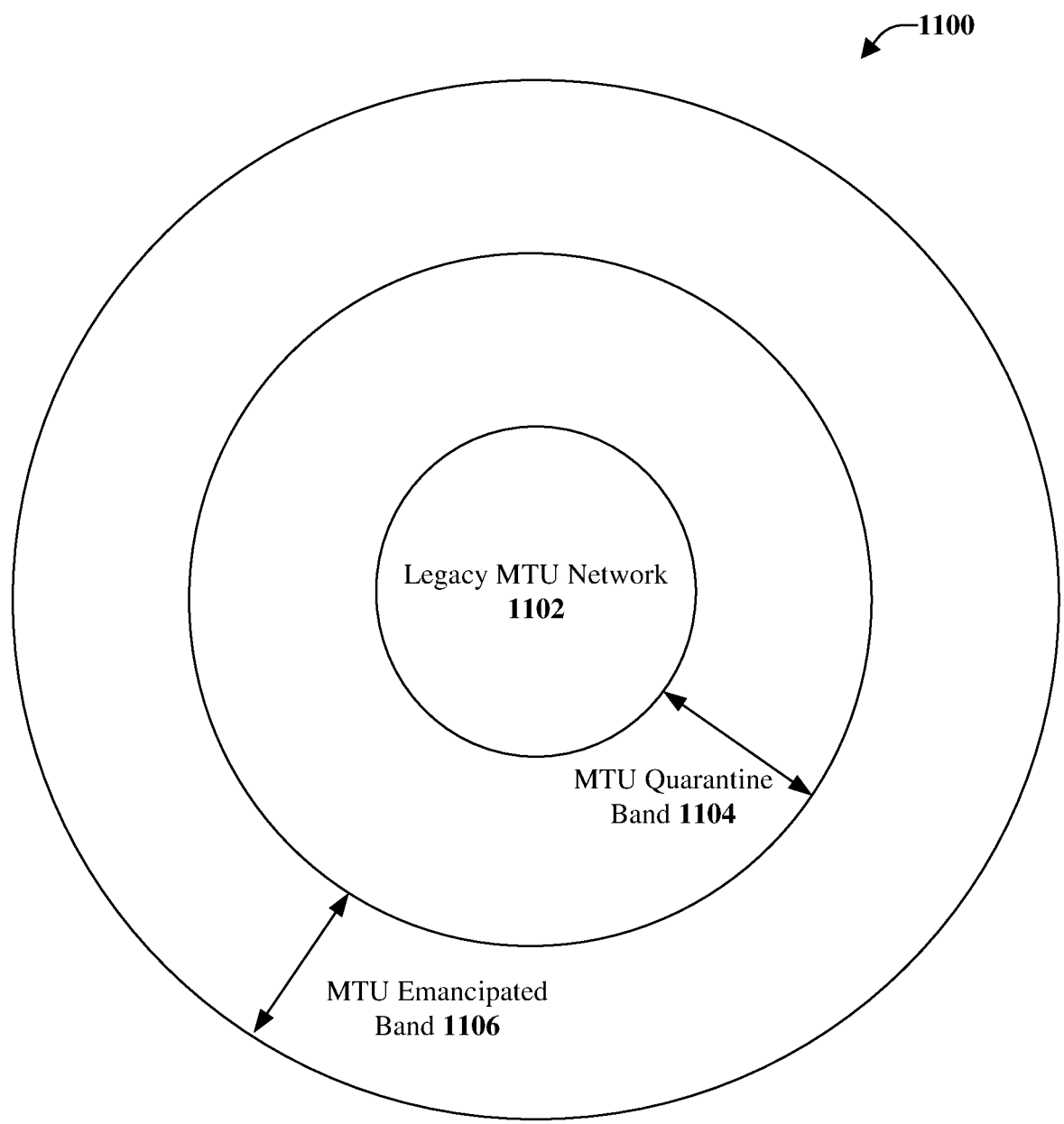
FIG. 11 illustrates an example, non-limiting, maximum transmission unit quarantine band network implementation in accordance with one or more embodiments described herein.

FIG. 11 illustrates an example, non-limiting, MTU quarantine band network implementation 1100 in accordance with one or more embodiments described herein. The introduction of any strategy to have variable MTU network settings coming back to a central routing point (PGW) is challenging, particularly if that network MTU knowledge is used to set variable MTU settings on the UE. Having the ability to set variable MTU settings on the UE, is desired in order to fully realize end-to-end MTU improvements that can drive increases in data throughput and reduction in latency.

For example, if a network, using PGW PCO options, provides an increased MTU to a UE in a network that supports a larger MTU design, and then that UE travels to a network that supports a lower MTU design, there has been no established method of updating the UE MTU setting. To further illustrate this point, refer back to FIG. 6. Suppose a UE authenticates in a MTU 2000 network which borders a 1500 MTU network. If that UE is provided a 1930 MTU size, and then drives to the MTU 1500 network, the UE packets will be too large for the 1500 network and will have to be fragmented. This fragmentation can reduce throughput and increase latency, which is undesired. In order to reduce the probability of such an occurrence, the use of a quarantine guard band is provided herein.

According to an example, GTP fragmentation can cause out of order packets if the traffic is of mixed size. As speeds are increased, the number of packets between the two fragments can break layer4 aware networking equipment such as firewalls, NAT and load balancers. Increasing buffer size is not practical as speeds are increased to 1 Gbps and beyond.

The quarantine guard band operates as a MTU safety zone around networks that only support lower MTU sizes. For example, a legacy MTU network 1102 can support MTU 1500, and is depicted in a first circle in a group of concentric circles. A second range or a second circle 1104 can be established around a geographic area represented by the first circle. The second circle 1104 represents a larger geographic area around the legacy MTU network 1102. For example, the second circle 1104 can represent a range of fifty miles for which the MTU quarantine band will be active, and represents MTU 1500. Further, a third circle 1106 represents an emancipated band that can represent a larger geographic area (e.g., 1,000 miles). Within the range of the MTU emancipated band (e.g., the third circle 1106), an emancipated MTU network can be capable of a higher MTU size (e.g., MTU 2000).

In further detail, for "X" number of miles surrounding the quarantined network, the UE is still provided the MTU setting of the quarantined network, by the PGW PCO option. This can be accomplished by the eNB, in the quarantine band, providing the quarantined MTU setting in the MTU signaling message to the PGW. Therefore, the UE can have the correct MTU setting if/when the UE is moved to the quarantined network. Returning to the above example, if the quarantined band was 50 miles, then all of the eNB's within a 50 mile radius of the quarantined network would be statically provisioned with the 1500 MTU setting, even though they could be capable of a 2000 maximum packet size. When a UE authenticates in this zone, they would be provided a 1430 MTU setting by the PGW. When the UE travels to the MTU 1500 quarantined network, it will have the optimum MTU setting, and therefore the UE packets will not have to be fragmented, and thus subjected to worse network performance.

If the UE, in the quarantined guard band, moves out of the guard band and goes to the higher MTU network of 2000, the UE will still be provisioned with the 1430 MTU packet size setting and thus cannot partake of the higher MTU packet size available in that network, but that is satisfactory, in order to keep the gains of not fragmenting in the legacy network. It is a tradeoff that overall reduces the amount of network fragmentation.

When the UE authenticates in the network emancipation band, that is where the end user will see the most gain, as the end user will experience the most significant increase in throughput and reduced latency, as the UE can take advantage of the full MTU available in the network emancipation zone. If the UE is moved from the network emancipation band into the MTU quarantine band, the UE will still keep the MTU that it authenticated with, and thus fragmentation can occur on its packets while in the MTU quarantine band. It is noted that it cannot be assumed that the more advanced equipment present in the MTU quarantine band will handle fragmentation better, than if fragmentation would occur in the legacy MTU network. Some newer equipment can be cost streamlined and be challenged by fragmentation, just as severely as older equipment. Adjustment of the size and location of the MTU quarantine band, could be adjusted, based on network conditions, to protect any equipment, either old or new, that is being challenged by excessive GTP packet fragmentation.

According to an alternative or additional implementation, if the MTU size is not compatible, the data session can be terminated and a new data session started. In some implementations, handoffs between incompatible MTU sized transports can be prevented or not supported.

Figure 12:
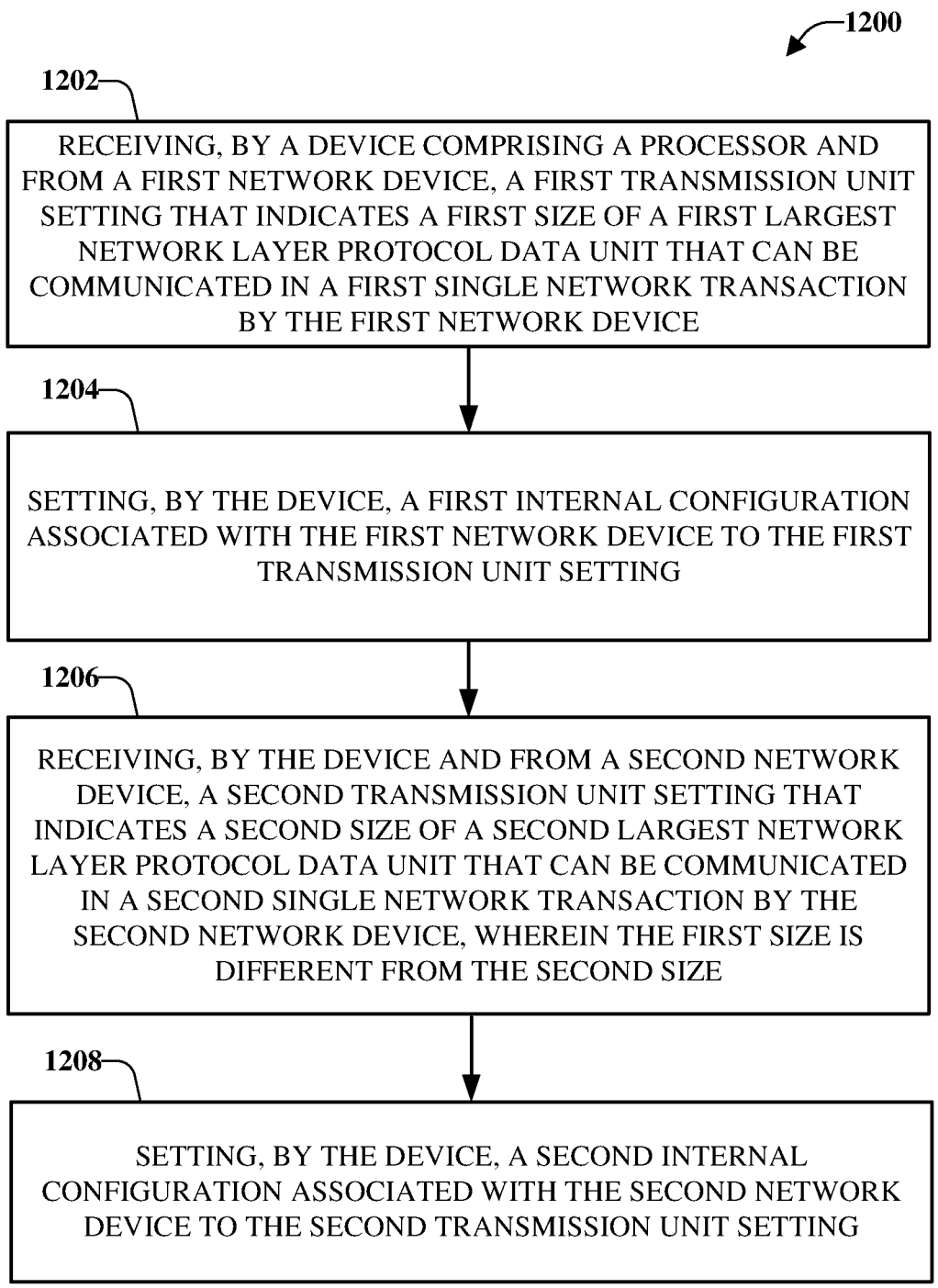
FIG. 12 illustrates an example, non-limiting, method for utilization of a flexible transmission unit packet core design in accordance with one or more embodiments described herein.

FIG. 12 illustrates an example, non-limiting, method for utilization of a flexible transmission unit packet core design in accordance with one or more embodiments described herein. Repetitive description of like elements employed in other embodiments described herein is omitted for sake of brevity. The method 1200 can be implemented by a network device of a wireless network, the network device comprising a processor. Alternatively, or additionally, a machine-readable storage medium can comprise executable instructions that, when executed by a processor, facilitate performance of operations for the method 1200.

At 1202, a first transmission unit setting can be received from a first network device. The first transmission unit setting can indicate a first size of a first largest network layer protocol data unit that can be communicated in a first single network transaction by the first network device. According to an example, receiving the first size can comprise receiving the first size in a general packet radio service tunneling protocol user data tunneling header that comprises an extension header. A first internal configuration (e.g., a data table) associated with the first network device can be set, at 1204, to the first transmission unit setting.

A second transmission unit setting can be received from a second network device at 1206. The second transmission unit setting can indicate a second size of a second largest network layer protocol data unit that can be communicated in a second single network transaction by the second network device. The first size can be different from the second size. Further, at 1208, a second internal configuration associated with the second network device can be set to the second transmission unit setting.

According to an implementation, the method can comprise determining a third size that represents the size of a transmission packet intended for a user equipment device in communication with the first network device. The third size can be less than the first size. Further to this implementation, the method can comprise facilitating a transmission of an indication of the third size and an identification of the user equipment device to the first network device. In an example, determining the third size can comprise determining an amount of overhead loss that occurs on a data plane path between the first network device and the user equipment device and reducing the first size by the amount of overhead loss.

According to an example, provided herein is a method of sending a static MTU setting to a centralized router and have that router dynamically associate the MTU capabilities of the edge part of the network. In another example, multiple MTU settings can be allowed on a single source IP address. In yet another example, "MTU advertising" of a source IP address MTU setting to destination IP addresses can be allowed. According to another example, provided is a method of broadcasting the local source IP address to advertise its MTU setting to all destination IP addresses, or to select few destination IP addresses, based on a local data structure that determines which destination IP addresses should get the MTU messages. In some examples provided is a method by which an end user, is provided a MTU setting, based on knowledge of the packet delivery limitations of the data plane path to it. Further, timeout values for PGW logic MTU data structure are provided herein. In addition, initial MTU default values on PGW data structure if source IP address is not in logical MTU data structure can be facilitated. In yet another example, MTU network updates as a mobile session IRATs from one MTU zone to another one that has a different MTU setting can also be facilitated with the disclosed aspects.

According to some implementations, the method can comprise populating a logical transmission unit data structure with a first capability of the first network device and a second capability of the second network device. Further, in the logical transmission unit data structure the first capability can be correlated to the first network device based on a first source internet protocol address of the first network device, and the second capability can be correlated to the second network device based on a second source internet protocol address of the second network device.

In accordance with an additional implementation, the method can comprise implementing a first quarantine band within a first geographic radius of the first network device, wherein the first quarantine band specifies a third transmission unit setting within the first quarantine band to be equal to the first size. Further to this additional implementation, the method can comprise implementing a second quarantine band within a second geographic radius of the first network device, wherein the second quarantine band specifies a fourth transmission unit setting within the first quarantine band to be equal to a third size which is a higher transmission unit setting than the first size.

The term "mobile device" can be interchangeable with (or include) a user equipment (UE) or other terminology. Mobile device (or user equipment) refers to any type of wireless device that communicates with a radio network node in a cellular or mobile communication system. Examples of UEs include, but are not limited to, a target device, a device to device (D2D) UE, a machine type UE or a UE capable of machine to machine (M2M) communication, a Personal Digital Assistant (PDA), a tablet, a mobile terminal, a smart phone, a laptop embedded equipment (LEE), a laptop mounted equipment (LME), a Universal Serial Bus (USB) dongle, and so on.

As used herein, the term "network device" can be interchangeable with (or include) a network, a network controller or any number of other network components. Further, as utilized herein, the non-limiting term radio network node, or simply network node (e.g., network device, network node device) is used herein to refer to any type of network node serving communication devices and/or connected to other network nodes, network elements, or another network node from which the communication devices can receive a radio signal. In cellular radio access networks (e.g., universal mobile telecommunications system (UMTS) networks), network devices can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network devices can also comprise multiple antennas for performing various transmission operations (e.g., Multiple Input Multiple Output (MIMO) operations). A network node can comprise a cabinet and other protected enclosures, an antenna mast, and actual antennas. Network devices can serve several cells, also called sectors, depending on the configuration and type of antenna. Examples of network nodes or radio network nodes (e.g., the network device 102) can include but are not limited to: NodeB devices, base station (BS) devices, access point (AP) devices, TRPs, and radio access network (RAN) devices. The network nodes can also include multi-standard radio (MSR) radio node devices, comprising: an MSR BS, a gNodeB, an eNode B, a network controller, a radio network controller (RNC), a base station controller (BSC), a relay, a donor node controlling relay, a base transceiver station (BTS), an access point (AP), a transmission point, a transmission node, a Remote Radio Unit (RRU), a Remote Radio Head (RRH), nodes in distributed antenna system (DAS), and the like.

Described herein are systems, methods, articles of manufacture, and other embodiments or implementations that can facilitate semi-open loop based transmission diversity for uplink transmissions for a 5G network. Facilitating semi-open loop based transmission diversity for uplink transmissions in a 5G network can be implemented in connection with any type of device with a connection to the communication network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

The various aspects described herein can relate to new radio, which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or LTE, or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies. Further, the various aspects can be utilized with any Radio Access Technology (RAT) or multi-RAT system where the mobile device operates using multiple carriers (e.g., LTE Frequency Division Duplexing (FDD)/Time-Division Duplexing (TDD), Wideband Code Division Multiplexing Access (WCMDA)/HSPA, Global System for Mobile Communications (GSM)/GSM EDGE Radio Access Network (GERAN), Wi Fi, Wireless Local Area Network (WLAN), WiMax, CDMA2000, and so on).

As used herein, "5G" can also be referred to as New Radio (NR) access. Accordingly, systems, methods, and/or machine-readable storage media for facilitating improvements to the uplink performance for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Figure 13:
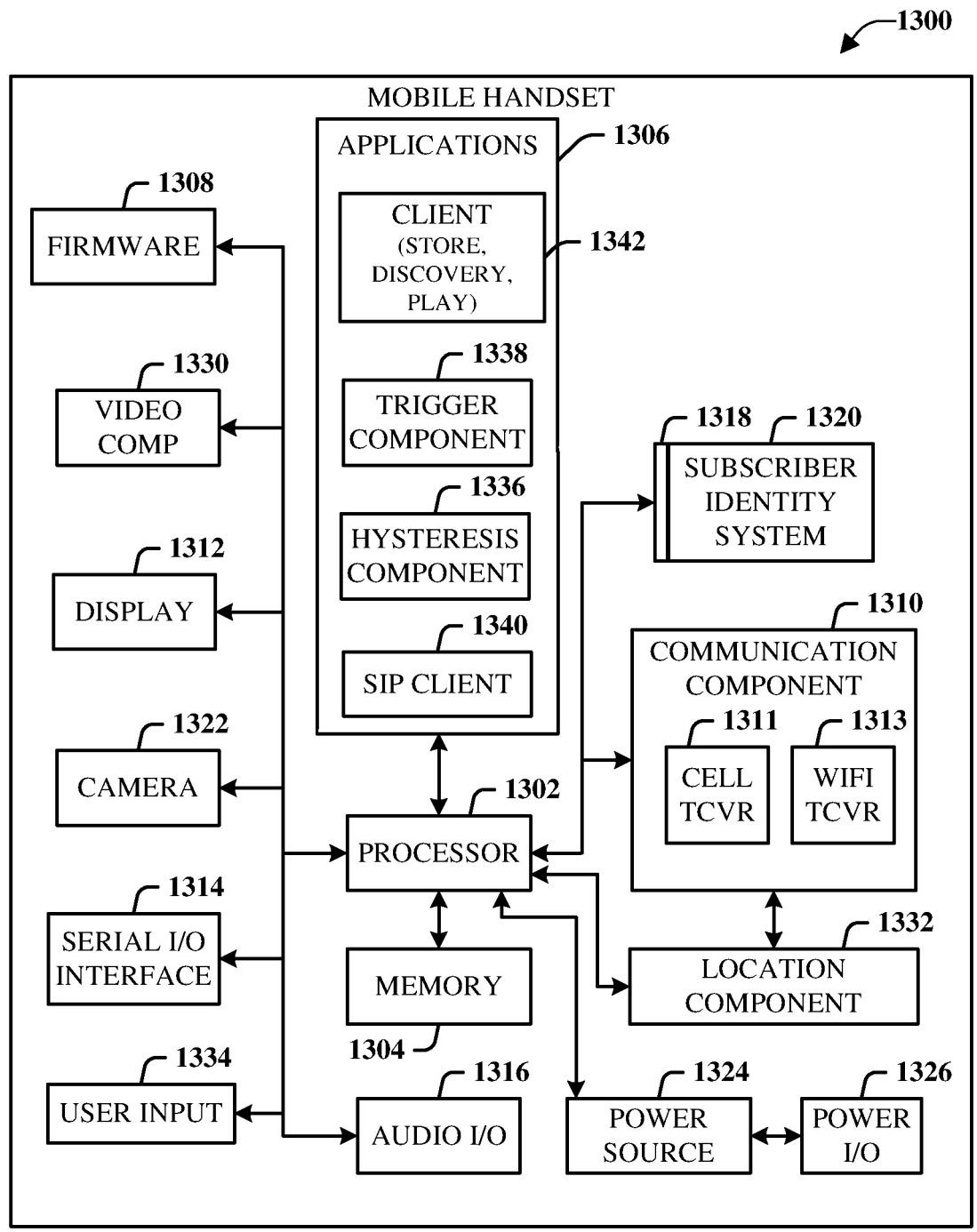
FIG. 13 illustrates an example block diagram of an example mobile handset operable to engage in a system architecture that facilitates wireless communications according to one or more embodiments described herein.

Referring now to FIG. 13, illustrated is an example block diagram of an example mobile handset 1300 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1302 for controlling and processing all onboard operations and functions. A memory 1304 interfaces to the processor 1302 for storage of data and one or more applications 1306 (e.g., a video player software, user feedback component software, etc.). Other applications can include voice recognition of predetermined voice commands that facilitate initiation of the user feedback signals. The applications 1306 can be stored in the memory 1304 and/or in a firmware 1308, and executed by the processor 1302 from either or both the memory 1304 or/and the firmware 1308. The firmware 1308 can also store startup code for execution in initializing the handset 1300. A communications component 1310 interfaces to the processor 1302 to facilitate wired/wireless communication with external systems, e.g., cellular networks, VoIP networks, and so on. Here, the communications component 1310 can also include a suitable cellular transceiver 1311 (e.g., a GSM transceiver) and/or an unlicensed transceiver 1313 (e.g., Wi-Fi, WiMax) for corresponding signal communications. The handset 1300 can be a device such as a cellular telephone, a PDA with mobile communications capabilities, and messaging-centric devices. The communications component 1310 also facilitates communications reception from terrestrial radio networks (e.g., broadcast), digital satellite radio networks, and Internet-based radio services networks.

The handset 1300 includes a display 1312 for displaying text, images, video, telephony functions (e.g., a Caller ID function), setup functions, and for user input. For example, the display 1312 can also be referred to as a "screen" that can accommodate the presentation of multimedia content (e.g., music metadata, messages, wallpaper, graphics, etc.). The display 1312 can also display videos and can facilitate the generation, editing and sharing of video quotes. A serial I/O interface 1314 is provided in communication with the processor 1302 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1300, for example. Audio capabilities are provided with an audio I/O component 1316, which can include a speaker for the output of audio signals related to, for example, indication that the user pressed the proper key or key combination to initiate the user feedback signal. The audio I/O component 1316 also facilitates the input of audio signals through a microphone to record data and/or telephony voice data, and for inputting voice signals for telephone conversations.

The handset 1300 can include a slot interface 1318 for accommodating a SIC (Subscriber Identity Component) in the form factor of a card Subscriber Identity Module (SIM) or universal SIM 1320, and interfacing the SIM card 1320 with the processor 1302. However, it is to be appreciated that the SIM card 1320 can be manufactured into the handset 1300, and updated by downloading data and software.

The handset 1300 can process IP data traffic through the communications component 1310 to accommodate IP traffic from an IP network such as, for example, the Internet, a corporate intranet, a home network, a person area network, etc., through an ISP or broadband cable provider. Thus, VOID traffic can be utilized by the handset 1300 and IP-based multimedia content can be received in either an encoded or a decoded format.

A video processing component 1322 (e.g., a camera) can be provided for decoding encoded multimedia content. The video processing component 1322 can aid in facilitating the generation, editing, and sharing of video quotes. The handset 1300 also includes a power source 1324 in the form of batteries and/or an AC power subsystem, which power source 1324 can interface to an external power system or charging equipment (not shown) by a power I/O component 1326.

The handset 1300 can also include a video component 1330 for processing video content received and, for recording and transmitting video content. For example, the video component 1330 can facilitate the generation, editing and sharing of video quotes. A location tracking component 1332 facilitates geographically locating the handset 1300. As described hereinabove, this can occur when the user initiates the feedback signal automatically or manually. A user input component 1334 facilitates the user initiating the quality feedback signal. The user input component 1334 can also facilitate the generation, editing and sharing of video quotes. The user input component 1334 can include such conventional input device technologies such as a keypad, keyboard, mouse, stylus pen, and/or touch screen, for example.

Referring again to the applications 1306, a hysteresis component 1336 facilitates the analysis and processing of hysteresis data, which is utilized to determine when to associate with the access point. A software trigger component 1338 can be provided that facilitates triggering of the hysteresis component 1336 when the Wi-Fi transceiver 1313 detects the beacon of the access point. A SIP client 1340 enables the handset 1300 to support SIP protocols and register the subscriber with the SIP registrar server. The applications 1306 can also include a client 1342 that provides at least the capability of discovery, play and store of multimedia content, for example, music.

The handset 1300, as indicated above related to the communications component 1310, includes an indoor network radio transceiver 1313 (e.g., Wi-Fi transceiver). This function supports the indoor radio link, such as IEEE 802.11, for the dual-mode GSM handset 1300. The handset 1300 can accommodate at least satellite radio services through a handset that can combine wireless voice and digital radio chipsets into a single handheld device.

Figure 14:
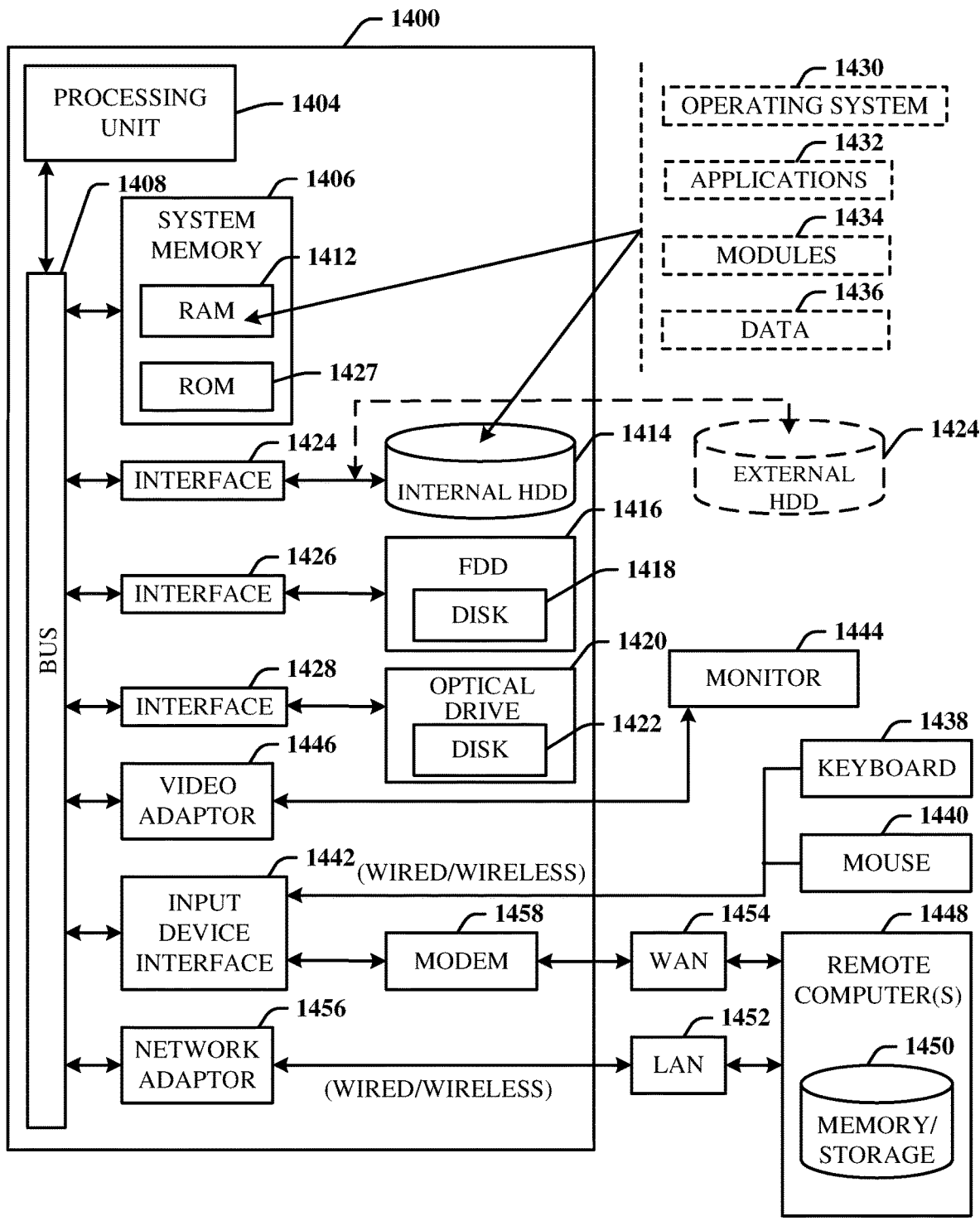
FIG. 14 illustrates an example block diagram of an example computer operable to engage in a system architecture that facilitates wireless communications according to one or more embodiments described herein.

Referring now to FIG. 14, illustrated is an example block diagram of an example computer 1400 operable to engage in a system architecture that facilitates wireless communications according to one or more embodiments described herein. The computer 1400 can provide networking and communication capabilities between a wired or wireless communication network and a server (e.g., Microsoft server) and/or communication device. In order to provide additional context for various aspects thereof, FIG. 14 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 14, implementing various aspects described herein with regards to the end-user device can include a computer 1400, the computer 1400 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes read-only memory (ROM) 1427 and random access memory (RAM) 1412. A basic input/output system (BIOS) is stored in a non-volatile memory 1427 such as ROM, EPROM, EEPROM, which BIOS contains the basic routines that help to transfer information between elements within the computer 1400, such as during start-up. The RAM 1412 can also include a high-speed RAM such as static RAM for caching data.

The computer 1400 further includes an internal hard disk drive (HDD) 1414 (e.g., EIDE, SATA), which internal hard disk drive 1414 can also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1400 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1400, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is to be appreciated that the innovation can be implemented with various commercially available operating systems or combinations of operating systems.

A user can enter commands and information into the computer 1400 through one or more wired/wireless input devices, e.g., a keyboard 1438 and a pointing device, such as a mouse 1440. Other input devices (not shown) can include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc.

A monitor 1444 or other type of display device is also connected to the system bus 1408 through an interface, such as a video adapter 1446. In addition to the monitor 1444, a computer 1400 typically includes other peripheral output devices (not shown), such as speakers, printers, etc.

The computer 1400 can operate in a networked environment using logical connections by wired and/or wireless communications to one or more remote computers, such as a remote computer(s) 1448. The remote computer(s) 1448 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which can connect to a global communications network, e.g., the Internet.

When used in a LAN networking environment, the computer 1400 is connected to the local network 1452 through a wired and/or wireless communication network interface or adapter 1456. The adapter 1456 can facilitate wired or wireless communication to the LAN 1452, which can also include a wireless access point disposed thereon for communicating with the wireless adapter 1456.

When used in a WAN networking environment, the computer 1400 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 through the input device interface 1442. In a networked environment, program modules depicted relative to the computer, or portions thereof, can be stored in the remote memory/storage device 1450. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of ⅓ with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A device, comprising:
a processor; and
a memory that stores executable instructions that, when executed by the processor, facilitate performance of operations, comprising:
receiving a first transmission unit setting from a first network device, wherein the receiving comprises receiving a broadcast message from the first network device, wherein the first transmission unit setting indicates a size of a largest network layer protocol data unit that is able to be communicated in a single network transaction by the first network device, and wherein the broadcast message comprises a local source internet protocol address of the first network device and is transmitted to a group of destination internet protocol addresses, comprising a destination internet protocol address of the device;
setting, at the device, a configuration of the first network device to the first transmission unit setting; and
sending first communication packets to the first network device using the first transmission unit setting and second communication packets to a second network device using a second transmission unit setting different from the first transmission unit setting.

2. The device of claim 1, wherein the sending the first communication packets to the first network device comprises fragmenting the first communication packets to satisfy the first transmission unit setting, and wherein the sending the second communication packets to the second network device comprises fragmenting the second communication packets to satisfy the second transmission unit setting.

3. The device of claim 1, wherein the first transmission unit setting is different than a defined transmission unit setting that is common to the first network device and the second network device.

4. The device of claim 1, wherein the group of destination internet protocol addresses are selected from a local data structure that indicates recipients of the broadcast message.

5. The device of claim 1, wherein the operations further comprise:
removing the local source internet protocol address of the first network device from a transmission unit logic data structure based on a determination that a defined time has elapsed since receipt of the first transmission unit setting from the first network device.

6. The device of claim 1, wherein the configuration of the first network device is a first configuration of the first network device, the operations further comprise:
determining a third transmission unit setting for a user equipment device serviced by the first network device; and
facilitating a second configuration of a transmission to the user equipment device based on the third transmission unit setting.

7. The device of claim 6, wherein the determining the third transmission unit setting comprises:
determining a byte value associated with packet delivery limitations of a data plane path between the first network device and the user equipment device; and
reducing the first transmission unit setting by the byte value to derive the third transmission unit setting.

8. The device of claim 6, wherein the operations further comprise:
updating the third transmission unit setting based on a determination that the user equipment device has moved from a first transmission unit zone associated with the first network device to a second transmission unit zone associated with a third network device that has a different transmission unit setting than the first transmission unit setting.

9. The device of claim 6, wherein the first network device is associated with a small cell network, and wherein the third transmission unit setting is reduced to accommodate a transmission capability of the small cell network.

10. The device of claim 1, wherein the first network device is a base station device and the device is a packet gateway device, wherein the receiving the first transmission unit setting from the first network device comprises receiving the first transmission unit setting from the base station device, and wherein the setting the configuration of the first network device comprises dynamically updating the packet gateway device based on the first transmission unit setting from the base station device.

11. The device of claim 1, wherein the device is a packet gateway device, wherein the first network device is a controller device, and wherein the receiving the first transmission unit setting from the first network device comprises periodically receiving a static file, from the controller device, that comprises the first transmission unit setting.

12. A method, comprising:
receiving, by a device comprising a processor and from a first network device, a first transmission unit setting that indicates a first size of a first largest network layer protocol data unit that can be communicated in a first single network transaction by the first network device;
setting, by the device, a first internal configuration associated with the first network device to the first transmission unit setting;
receiving, by the device and from a second network device, a second transmission unit setting that indicates a second size of a second largest network layer protocol data unit that can be communicated in a second single network transaction by the second network device, wherein the first size is different from the second size;
setting, by the device, a second internal configuration associated with the second network device to the second transmission unit setting;
determining, by the device, a third size that represents a size of a transmission packet intended for a user equipment device in communication with the first network device, wherein the third size is less than the first size; and
facilitating, by the device, a transmission of an indication of the third size and an identification of the user equipment device to the first network device.

13. The method of claim 12, wherein the determining the third size comprises:
determining an amount of overhead loss that occurs on a data plane path between the first network device and the user equipment device; and
reducing the first size by the amount of overhead loss.

14. The method of claim 12, wherein the receiving the first size comprises receiving the first size in a general packet radio service tunneling protocol user data tunneling header that comprises an extension header.

15. The method of claim 12, further comprising:
populating, by the device, a logical transmission unit data structure with a first capability of the first network device and a second capability of the second network device;
correlating, by the device and in the logical transmission unit data structure, the first capability to the first network device based on a first source internet protocol address of the first network device; and
correlating, by the device and in the logical transmission unit data structure, the second capability to the second network device based on a second source internet protocol address of the second network device.

16. The method of claim 12, further comprising:
implementing, by the device, a first quarantine band within a first geographic radius of the first network device, wherein the first quarantine band specifies a third transmission unit setting within the first quarantine band to be equal to the first size; and
implementing, by the device, a second quarantine band within a second geographic radius of the first network device, wherein the second quarantine band specifies a fourth transmission unit setting within the first quarantine band to be equal to the third size which is a higher transmission unit setting than the first size.

17. A non-transitory machine-readable storage medium, comprising executable instructions that, when executed by a processor of a network device of a wireless network, facilitate performance of operations, comprising:
receiving, from a first network device, a first signal that comprises a first value that represents a first transmission unit setting supported by the first network device, wherein the first signal is received in a general packet radio service tunneling protocol user data tunneling header that comprises an extension header;
receiving, from a second network device, a second signal that comprises a second value that represents a second transmission unit setting supported by the second network device, wherein the second value is different from the first value; and
facilitating a first transmission of a first group of packets to the first network device based on the first value and a second transmission of a second group of packets to the second network device based on the second value.

18. The method of claim 12, wherein the receiving the first transmission unit setting comprises receiving a broadcast message from the first network device, the broadcast message comprises a local source internet protocol address of the first network device and is transmitted to a group of destination internet protocol addresses, comprising a destination internet protocol address of the device.

19. The method of claim 12, wherein the transmission is a first transmission, and wherein the method further comprises:
determining a third transmission unit setting for the user equipment device serviced by the first network device; and
facilitating a second configuration of a second transmission to the user equipment device based on the third transmission unit setting.

20. The method of claim 19, wherein the determining the third transmission unit setting comprises:
determining a byte value associated with packet delivery limitations of a data plane path between the first network device and the user equipment device; and
reducing the first transmission unit setting by the byte value to derive the third transmission unit setting.

* * * * *